US012785768B2

(12) United States Patent
Prasad et al.

(10) Patent No.: US 12,785,768 B2
(45) Date of Patent: Nov. 3, 2026

(54) TECHNIQUES FOR BEAMFORMING WEIGHT-VECTORS SELECTION AND CYCLING

(71) Applicant: QUALCOMM Incorporated, San Diego, CA (US)

(72) Inventors: Narayan Prasad, Westfield, NJ (US); Meilong Jiang, Westfield, NJ (US); Juergen Cezanne, Ocean Township, NJ (US); Ahmed Bedewy, Hillsborough, NJ (US); Tao Luo, San Diego, CA (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/678,483

(22) Filed: May 30, 2024

(65) Prior Publication Data

US 2025/0373293 A1 Dec. 4, 2025

(51) Int. Cl.
*H04B 7/06* (2006.01)
*H04B 7/04* (2017.01)
*H04W 8/22* (2009.01)

(52) U.S. Cl.
CPC ....... *H04B 7/0617* (2013.01); *H04B 7/04013* (2023.05); *H04B 7/0634* (2013.01); *H04W 8/22* (2013.01)

(58) Field of Classification Search
None
See application file for complete search history.

(56) References Cited

U.S. PATENT DOCUMENTS 11,019,601 B2 * 5/2021 Lee .................... H04B 7/06952
11,533,762 B2 * 12/2022 Kang .................... H04B 7/0404
11,678,258 B2 * 6/2023 Lee .................... H04W 48/08 370/329
11,683,842 B2 * 6/2023 Kang .................... H04B 7/0404 370/329
11,706,812 B2 * 7/2023 Kang .................... H04B 7/0404 370/338
2019/0268879 A1 * 8/2019 Lee .................... H04B 7/06952
2020/0288451 A1 * 9/2020 Lee .................... H04W 48/08
2021/0176780 A1 * 6/2021 Kang .................... H04B 7/0404
2021/0176797 A1 * 6/2021 Kang .................... H04B 7/0404
2021/0282180 A1 * 9/2021 Kang .................... H04B 7/0404
2025/0167844 A1 * 5/2025 Zhang .................... H04B 7/0639
2025/0373293 A1 * 12/2025 Prasad .................... H04B 7/0617

* cited by examiner

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a transmission reception point (TRP) may transmit, to a network node, capability information indicating a capability of the TRP to cycle through a set of beamforming weight-vectors when the TRP is performing a transmission. The TRP may receive, from the network node and based at least in part on the capability information, an indication of one or more beam-forming-weight-vectors-cycling parameters. The TRP may perform the transmission by cycling through the set of beamforming weight-vectors based at least in part on the one or more beamforming-weight-vectors-cycling parameters. Numerous other aspects are described.

30 Claims, 9 Drawing Sheets

TECHNIQUES FOR BEAMFORMING WEIGHT-VECTORS SELECTION AND CYCLING

FIELD OF THE DISCLOSURE

Aspects of the present disclosure generally relate to wireless communication and specifically relate to techniques, apparatuses, and methods for beamforming weight-vectors selection and cycling.

DESCRIPTION OF RELATED ART

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a network node includes receiving, from a transmission reception point (TRP), capability information indicating a capability of the TRP to cycle through a set of beamforming weight-vectors when the TRP is performing a transmission; and transmitting, to the TRP and based at least in part on the capability information, an indication of one or more beamforming-weight-vectors-cycling parameters associated with cycling through the set of beamforming weight-vectors.

In some aspects, a method of wireless communication performed by a TRP includes transmitting, to a network node, capability information indicating a capability of the TRP to cycle through a set of beamforming weight-vectors when the TRP is performing a transmission; receiving, from the network node and based at least in part on the capability information, an indication of one or more beamforming-weight-vectors-cycling parameters; and performing the transmission by cycling through the set of beamforming weight-vectors based at least in part on the one or more beamforming-weight-vectors-cycling parameters.

In some aspects, an apparatus for wireless communication includes one or more memories; and one or more processors coupled to the one or more memories, the one or more processors individually or collectively configured to: receive, from a TRP, capability information indicating a capability of the TRP to cycle through a set of beamforming weight-vectors when the TRP is performing a transmission; and transmit, to the TRP and based at least in part on the capability information, an indication of one or more beamforming-weight-vectors-cycling parameters associated with cycling through the set of beamforming weight-vectors.

In some aspects, an apparatus for wireless communication includes one or more memories; and one or more processors coupled to the one or more memories, the one or more processors individually or collectively configured to: transmit, to a network node, capability information indicating a capability of the apparatus to cycle through a set of beamforming weight-vectors when the apparatus is performing a transmission; receive, from the network node and based at least in part on the capability information, an indication of one or more beamforming-weight-vectors-cycling parameters; and perform the transmission by cycling through the set of beamforming weight-vectors based at least in part on the one or more beamforming-weight-vectors-cycling parameters.

In some aspects, a non-transitory computer-readable medium storing a set of instructions for wireless communication includes one or more instructions that, when executed by one or more processors of a network node, cause the network node to: receive, from a TRP, capability information indicating a capability of the TRP to cycle through a set of beamforming weight-vectors when the TRP is performing a transmission; and transmit, to the TRP and based at least in part on the capability information, an indication of one or more beamforming-weight-vectors-cycling parameters associated with cycling through the set of beamforming weight-vectors.

In some aspects, a non-transitory computer-readable medium storing a set of instructions for wireless communication includes one or more instructions that, when executed by one or more processors of a TRP, cause the TRP to: transmit, to a network node, capability information indicating a capability of the TRP to cycle through a set of beamforming weight-vectors when the TRP is performing a transmission; receive, from the network node and based at least in part on the capability information, an indication of one or more beamforming-weight-vectors-cycling parameters; and perform the transmission by cycling through the set of beamforming weight-vectors based at least in part on the one or more beamforming-weight-vectors-cycling parameters.

In some aspects, an apparatus for wireless communication includes means for receiving, from a TRP, capability information indicating a capability of the TRP to cycle through a set of beamforming weight-vectors when the TRP is performing a transmission; and means for transmitting, to the TRP and based at least in part on the capability information, an indication of one or more beamforming-weight-vectors-cycling parameters associated with cycling through the set of beamforming weight-vectors.

In some aspects, an apparatus for wireless communication includes means for transmitting, to a network node, capability information indicating a capability of the apparatus to cycle through a set of beamforming weight-vectors when the apparatus is performing a transmission; means for receiving, from the network node and based at least in part on the capability information, an indication of one or more beamforming-weight-vectors-cycling parameters; and means for performing the transmission by cycling through the set of beamforming weight-vectors based at least in part on the one or more beamforming-weight-vectors-cycling parameters.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
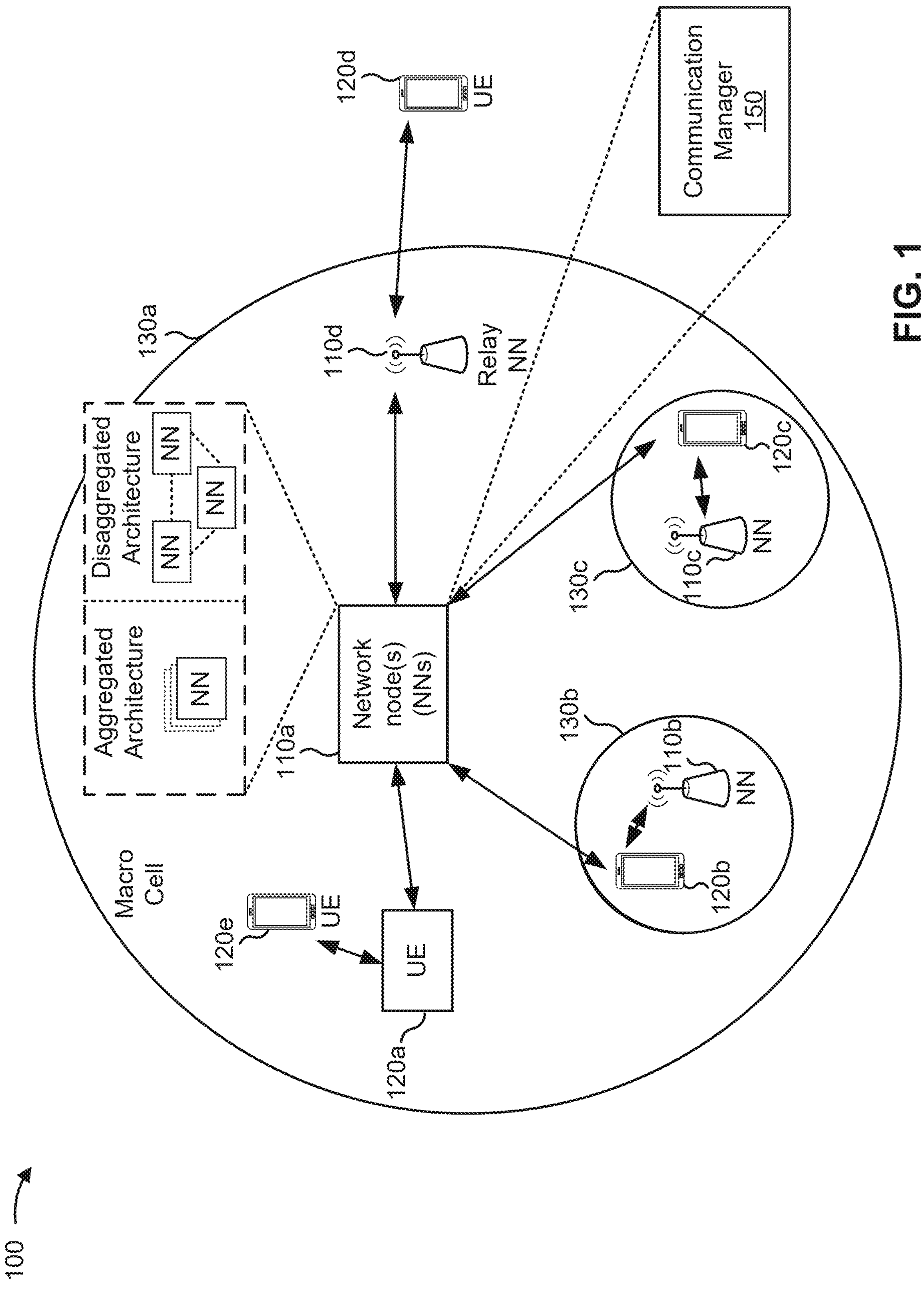
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, a network entity, such as a transmission reception point (TRP) or a similar network entity, may be capable of transmitting communications using a reconfigurable holographic surface (RHS) (sometimes referred to herein as an RHS-array). An RHS may include multiple feeds and multiple metamaterial radiation elements (sometimes referred to herein as RHS elements). Unlike external feeds used in conventional reflect and/or transmit arrays, which may be attached externally to the reflect and/or transmit arrays, the feeds of an RHS may be attached to the edge of a meta-surface forming the body of the RHS, thereby enabling a conformal and/or thin structure of the RHS. In such examples, a transmitter may send transmitted signals to radio frequency (RF) chains, and the RF chains may up-convert the signals to a carrier frequency and/or may send the up-converted signals in the form of currents to the feeds of the RHS. Through each feed, an electromagnetic (EM) wave (sometimes referred to as a reference wave) propagates along the RHS elements (e.g., the metamaterial elements), exciting the RHS elements in a sequential fashion. Moreover, the reference wave is capable of being emitted to free space from each radiation element as a leaky wave, thereby transmitting a signal from the surface of the RHS. In some examples, the network entity (e.g., TRP) may be capable of controlling an amplitude of a leaky wave at each radiation element (e.g., such that each element may be controlled to either radiate strongly or weakly), such as for a purpose of enabling beamforming by the RHS. In some cases, a specific configuration of amplitude levels across all the radiation elements of the RHS is referred to a holographic pattern, and/or beamforming at an RHS using one or more holographic patterns may be referred to as holographic beamforming.

In some instances, implementing holographic beamforming using amplitude-control of the various radiation elements may result in high sidelobe levels. These sidelobes may impact one or more unintended directions, such as by interfering with wireless communications in directions associated with the sidelobes. Moreover, holographic beamforming may be associated with high power consumption at the network entity (e.g., the TRP). More particularly, in some examples, amplitude-control may be achieved via tunable electronic components, such as by using one or more positive-intrinsic-negative (PIN) diodes per radiation element. For example, in some examples, in order to achieve tunable components over millimeter wave (mmWave) and/or sub-THz frequencies, two PIN-diodes may be used per radiation element to achieve binary amplitude control. Utilizing these tunable electric components (e.g., PIN diodes) to achieve holographic beamforming may result in high surface power consumption. Put another way, a high level of power consumed across all PIN-diodes in their ON or conducting states may be necessary to achieve high peak beamforming gain, because, for PIN-diode based binary amplitude control, approximately half of the PIN-diodes may need to be in an ON state to realize maximal beamforming gain.

Various aspects relate generally to beamforming weight-vectors (e.g., holographic patterns) selection and cycling. Some aspects more specifically relate to power control and/or sidelobe interference control by selecting a set of beamforming weight-factors and/or cycling through a set of beamforming weight-factors. In some aspects, a TRP (e.g., an RHS-TRP) may transmit, and a network node may receive, capability information indicating a capability of the TRP to cycle through a set of beamforming weight-vectors when the TRP is performing a transmission. The network node may select one or more beamforming-weight-vectors-cycling (BWVC) parameters (e.g., a surface power threshold, a protected direction from interference, and/or similar parameters) to be used by the TRP when the TRP is performing the transmission. The TRP may perform the transmission by cycling through the set of beamforming weight-vectors based at least in part on the one or more BWVC parameters.

Particular aspects of the subject matter described in this disclosure can be implemented to realize one or more of the following potential advantages. In some examples, by selecting one or more beamforming weight-vectors (e.g., holographic patterns) based at least in part on a the BWVC parameters, the described techniques can be used to reduce power consumption at the TRP (e.g., power consumption by PIN diodes used to electronically control the radiation elements at an RHS associated with the TRP). In some other examples, by cycling through the set of beamforming weight-vectors based at least in part on the one or more BWVC parameters, the TRP may minimize sidelobe interference in any one direction, thereby protecting communications of wireless communication devices in relative proximity to the TRP.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, RF sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4*a* or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-*a* or FR4-1, or FR5, and/or that are within the EHF band. Higher frequency bands may extend 5G NR operation, 6G operation, and/or other RATs beyond 52.6 GHz. For example, each of FR4*a*, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-*a*, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a TRP, a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unscrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the network node 110 may include a communication manager 150. As described in more detail elsewhere herein, the communication manager 150 may receive, from a TRP, capability information indicating a capability of the TRP to cycle through a set of beamforming weight-vectors when the TRP is performing a transmission; and transmit, to the TRP and based at least in part on the capability information, an indication of one or more beamforming-weight-vectors-cycling parameters associated with cycling through the set of beamforming weight-vectors. Additionally, or alternatively, the communication manager 150 may transmit, to a network node, capability information indicating a capability of the TRP to cycle through a set of beamforming weight-vectors when the TRP is performing a transmission; receive, from the network node and based at least in part on the capability information, an indication of one or more beamforming-weight-vectors-cycling parameters; and perform the transmission by cycling through the set of beamforming weight-vectors based at least in part on the one or more beamforming-weight-vectors-cycling parameters. Additionally, or alternatively, the communication manager 150 may perform one or more other operations described herein.

As indicated above, FIG. 1 is provided as an example. Other examples may differ from what is described with regard to FIG. 1.

Figure 2:
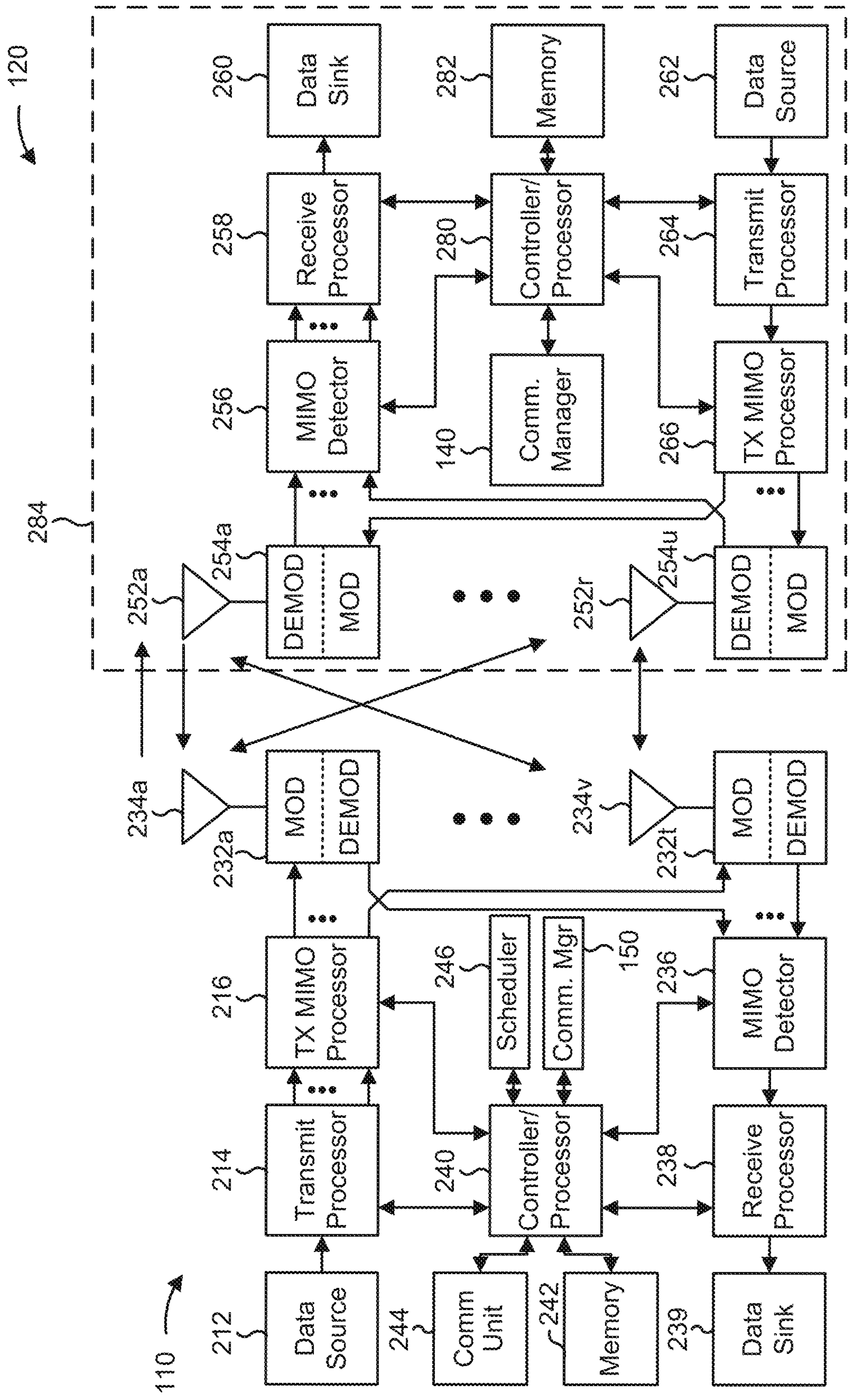
FIG. 2 is a diagram illustrating an example network node in communication with an example user equipment (UE) in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems **232*a* through 232*t* may together transmit a set of downlink signals (for example, T downlink signals) via the corresponding set of antennas 234**.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
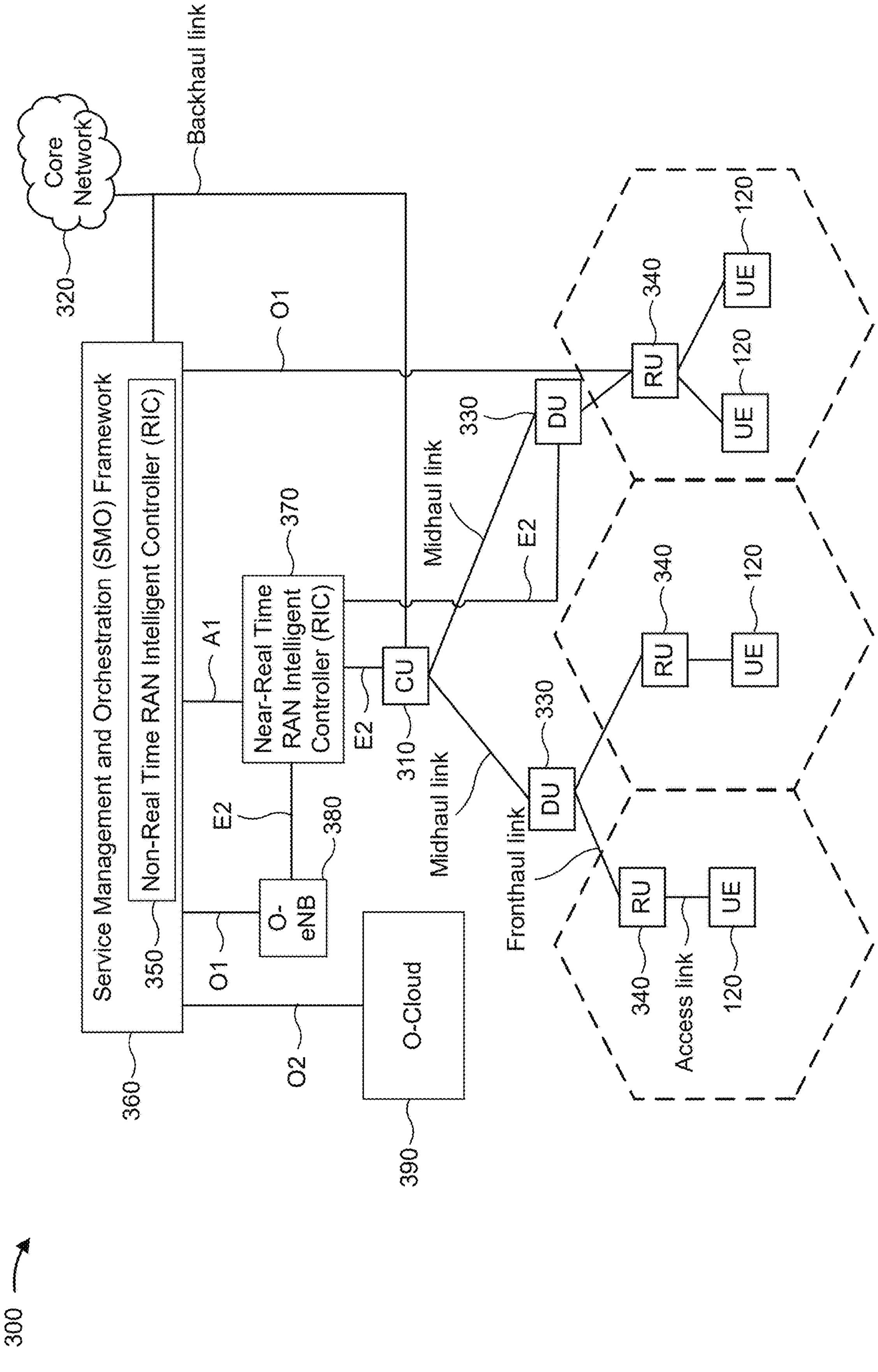
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with beamforming weight-vectors selection and cycling, as described in more detail elsewhere herein. For example, the controller/processor 240 of the network node 110, the controller/processor 280 of the UE 120, any other component(s) (or combinations of components) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). In some aspects, the TRP and/or network entity described herein is the network node 110, is included in the network node 110, or includes one or more components of the network node 110 shown in FIG. 2. The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, or other processes as described herein. In some examples, executing instructions may include running the instructions, converting the instructions, compiling the instructions, and/or interpreting the instructions, among other examples.

In some aspects, the network node 110 includes means for receiving, from a TRP, capability information indicating a capability of the TRP to cycle through a set of beamforming weight-vectors when the TRP is performing a transmission; and/or means for transmitting, to the TRP and based at least in part on the capability information, an indication of one or more beamforming-weight-vectors-cycling parameters associated with cycling through the set of beamforming weight-vectors. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

In some aspects, the network node 110 includes means for transmitting, to a network node, capability information indicating a capability of a TRP to cycle through a set of beamforming weight-vectors when the TRP is performing a transmission; means for receiving, from the network node and based at least in part on the capability information, an indication of one or more beamforming-weight-vectors-cycling parameters; and/or means for performing the transmission by cycling through the set of beamforming weight-vectors based at least in part on the one or more beamforming-weight-vectors-cycling parameters. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
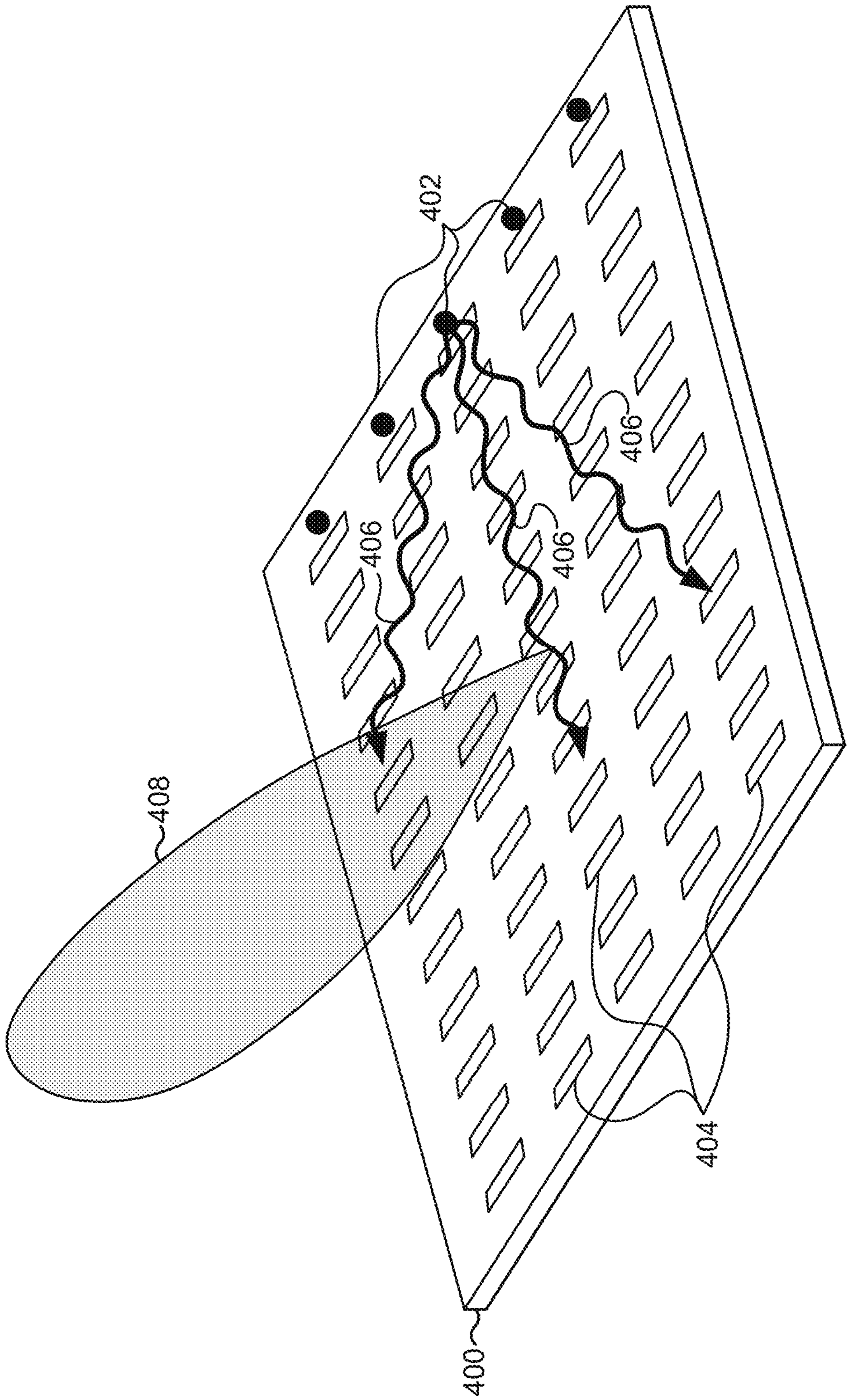
FIG. 4 is a diagram illustrating an example reconfigurable holographic surface, in accordance with the present disclosure.

FIG. 4 is a diagram illustrating an example RHS 400, in accordance with the present disclosure.

In some examples, a network entity, such as a TRP or a similar network entity, may be capable of transmitting communications using an RHS, such as the RHS 400 shown in FIG. 4. As shown, the RHS 400 may include multiple feeds 402 and multiple metamaterial radiation elements 404 (e.g., multiple RHS elements). Unlike external feeds used in conventional reflect and/or transmit arrays (which may be attached externally to the reflect and/or transmit arrays), the feeds 402 of the RHS 400 may be attached to the edge of a meta-surface forming the body of the RHS 400, thereby enabling a conformal and/or thin structure of the RHS 400.

In such examples, a transmitter (not shown) may send transmitted signals to RF chains (not shown), and the RF chains may up-convert the signals to a carrier frequency and/or may send the up-converted signals in the form of currents to the feeds 402 of the RHS 400. Through each feed 402, an EM wave 406 (e.g., a reference wave) propagates along the radiation elements 404 (e.g., the RHS elements), exciting the radiation elements 404 in a sequential fashion. Moreover, the RHS 400 may be capable of emitting the EM wave 406 to free space from each radiation element 404 as a leaky wave, thereby transmitting a signal from the surface of the RHS 400.

In some examples, the network entity (e.g., the TRP) may be capable of controlling an amplitude of a leaky wave at each radiation element 404 (e.g., such that each radiation element 404 may be controlled to either radiate strongly or weakly), thereby enabling beamforming by the RHS 400. For example, a TRP associated with the RHS (e.g., an RHS-TRP) may be capable of controlling the amplitude of the leaky wave at each radiation element 404 in order to form the beam 408 (sometimes referred to as an object wave) shown in FIG. 4. In some cases, a specific configuration of amplitude levels across all the radiation elements 404 of the RHS 400 is referred to a holographic pattern, and/or beamforming at an RHS 400 using one or more holographic patterns may be referred to as holographic beamforming. Examples of holographic beamforming are described in more detail below in connection with FIG. 5.

In some instances, implementing holographic beamforming using amplitude-control of the various radiation elements 404 of the RHS 400 may result in high sidelobe levels. Sidelobes refer to lobes (e.g., local maxima) of the radiation pattern of the RHS 400 that are not the main lobe of the radiation pattern (e.g., the beam 408, which may be a region of radiation patten containing the highest peak gain and/or exhibiting the greatest field strength). In some examples, sidelobes caused by holographic beamforming may impact one or more unintended directions, such as by interfering with wireless communications in directions associated with the sidelobes, thus leading to communication errors, high power, computing, and network resource consumption for correcting communication errors, and otherwise inefficient usage of network resources.

Moreover, holographic beamforming may be associated with high power consumption at the network entity (e.g., a TRP associated with the RHS 400). More particularly, in some examples, amplitude-control may be achieved via tunable electronic components, such as by using one or more PIN diodes per radiation element 404. For example, in some examples, in order to achieve tunable components over mmWave and/or sub-THz frequencies, two PIN-diodes may be used per radiation element to achieve binary amplitude control. Utilizing these tunable electric components (e.g., PIN diodes) to achieve holographic beamforming may result in high surface power consumption. Put another way, a high level of power consumed across all PIN-diodes in their ON or conducting states may be necessary to achieve high peak beamforming gain, because, for PIN-diode based binary amplitude control, approximately half of the PIN-diodes may need to be in an ON state to realize maximal beamforming gain.

Some techniques described herein may enable beamforming weight-vector (e.g., holographic pattern) selection and cycling, and/or power control and/or sidelobe interference control by selecting a set of beamforming weight-factors and/or cycling through a set of beamforming weight-factors. In some aspects, a TRP (e.g., an RHS-TRP) may transmit, and a network node may receive, capability information indicating a capability of the TRP to cycle through a set of beamforming weight-vectors (e.g., a set of holographic patterns) when the TRP is performing a transmission. The network node may select one or more BWVC parameters (e.g., a surface power threshold, a protected direction from interference, and/or similar parameters) to be used by the TRP when the TRP is performing the transmission. The TRP may thus perform the transmission by cycling through the set of beamforming weight-vectors based at least in part on the one or more BWVC parameters. As a result, power consumption at a TRP may be reduced, and/or the TRP may minimize sidelobe interference in any one direction, thereby protecting communications of wireless communication devices in relative proximity to the TRP and thus reducing communication errors and power, computing, and network resource consumption otherwise required to correct communication errors.

As indicated above, FIG. 4 is provided as an example. Other examples may differ from what is described with respect to FIG. 4.

Figure 5:
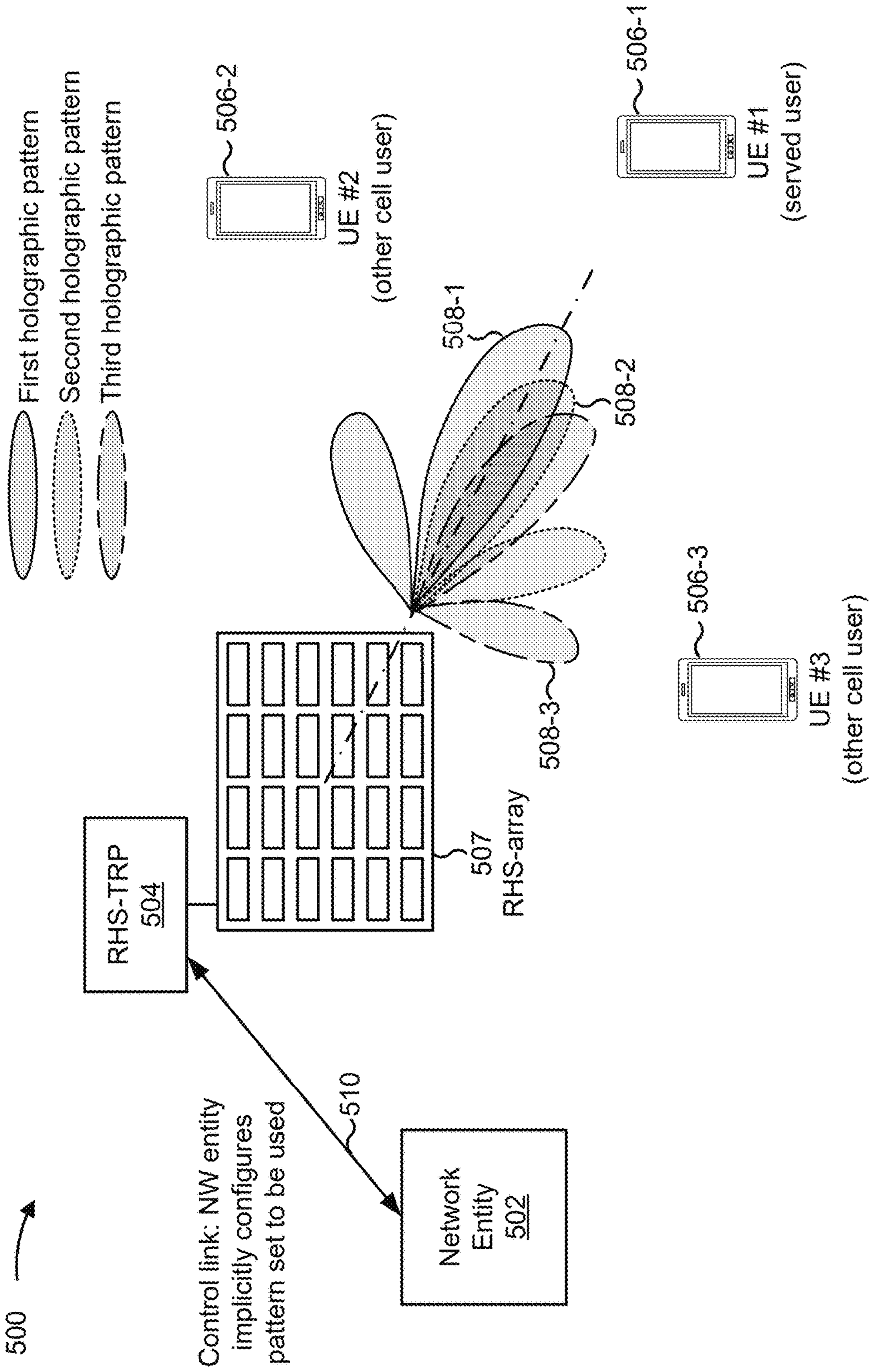
FIG. 5 is a diagram illustrating an example associated with holographic pattern selection and cycling, in accordance with the present disclosure.

FIG. 5 is a diagram illustrating an example 500 associated with holographic pattern selection and cycling, in accordance with the present disclosure. As shown in FIG. 5, example 500 includes communication between a network entity 502 (e.g., a network node 110, a CU, a DU, an RU, and/or a similar network entity), an RHS-TRP 504 (e.g., a network node 110, a DU, an RU, and/or a similar network entity), and one or more UEs 506 (shown as a first UE 506-1 through a third UE 506-3, each of which may correspond to the UE 120 described above in connection with FIGS. 1 and 2). In some aspects, the network entity 502, the RHS-TRP 504, and/or the UEs 506 may be included in a wireless network, such as wireless communication network 100.

In some aspects, the RHS-TRP 504 may include an RHS-array 507, which may correspond to the RHS 400 described above in connection with FIG. 4. Additionally, or alternatively, the RHS-TRP 504 and one or more of the UEs 506 may be configured to communicate using beamforming by the RHS-array 507. For example, the RHS-TRP 504 may be capable of transmitting communications to one or more of the UEs 506 using beamforming, such as by using one or more holographic patterns at the RHS-array 507 to form a beam (e.g., beam 408) to communicate with one or more of the UEs 506, in a similar manner as described above in connection with FIG. 4.

In some aspects, by leveraging the presence of a large number of radiation elements (e.g., radiation elements 404) on the RHS-array 507, the RHS-TRP 504 may be associated with multiple feasible holographic patterns that share certain attributes, such as having similar main-lobe pointing directions, similar peak gains, and/or similar surface-power-consumption levels. For example, in the example 500, the first UE 506-1 is a served user by the RHS-TRP 504 (e.g., the first UE 506-1 may in communication with the RHS-TRP 504 via the RHS-array 507, and, more particularly, may be configured to receive downlink communications via the RHS-array 507), while the second UE 506-2 and/or the third UE 506-3 may be other cell users (e.g., the second UE 506-2 and/or the third UE 506-3 may be served by one or more network entities different from the RHS-TRP 504). In such aspects, the RHS-TRP 504, and more particularly the RHS-array 507, may be capable of communicating with the first UE 506-1 using multiple holographic patterns, with each holographic pattern resulting in a set of beams 508 (shown in FIG. 5 as a first set of beams 508-1, corresponding to a first holographic pattern, through a third set of beams 508-3, corresponding to a third holographic pattern). In some aspects, each set of beams 508 may be sufficient to serve the first UE 506-1, because the sets of beams 508 are associated with a similar main lobe pointing direction (e.g., a main lobe that generally points at the first UE 506-1), a similar a peak gain (e.g., a peak gain within a certain margin of a maximum peak gain among the sets of beams 508), and/or a similar surface-power consumption (e.g., a surface-power-consumption level that satisfies a surface-power-consumption threshold, described in more detail below).

However, the sets of beams 508 may be associated with different sidelobe attributes, and thus may result in different levels of interference for other wireless communication devices, such as the second UE 506-2 and/or the third UE 506-3, among other examples. More particularly, the first set of beams 508-1 (shown in example 500 using solid lines) may be associated with high-directivity towards the first UE 506-1 and/or may be associated with highest peak gain towards the first UE 506-1, but may be associated with a prominent sidelobe that may impact (e.g., that may interfere with communications at) the second UE 506-2. The second set of beams 508-2 (shown in example 500 using even-length broken lines) may be associated with high-directivity towards the first UE 506-1 and/or may be associated with a peak gain towards the first UE 506-1 near that of the first set of beams 508-1, but may be associated with a different prominent sidelobe that may impact (e.g., that may interfere with communications at) the third UE 506-3. Similarly, the third set of beams 508-3 (shown in example 500 using uneven-length broken lines) may be associated with high-directivity towards the first UE 506-1 and/or may be associated with a peak gain towards the first UE 506-1 near that of the first set of beams 508-1, but may be associated with a different prominent sidelobe that may impact (e.g., that may interfere with communications at) the third UE 506-3.

In some aspects, the RHS-TRP 504 may cycle among the set of holographic patterns (e.g., cycle among the three holographic patterns used to generate the first set of beams 508-1, the second set of beams 508-2, and the third set of beams 508-3), such as for a purpose of randomizing interference levels at other wireless communication devices caused by the sidelobes of the set of beams 508, among other examples. Put another way, the RHS-TRP 504 may cycle among companion holographic patterns in order to avoid any specific other-cell UE (e.g., the second UE 506-2 and/or the third UE 506-3 in the example 500) being subject to high interference, while still maintaining an acceptable peak gain for serving the first UE 506-1. In this way, because accurate direction and/or location information for wireless communication devices nearby the RHS-TRP 504 but not being served by the RHS-TRP 504 (e.g., the second UE 506-2 and/or the third us 506-3) may not be available to the RHS-TRP 504, cycling among the holographic patterns (e.g., the holographic patterns used to generate the first set of beams 508-1 through the third set of beams 508-3) may maintain a certain gain level for the served UE (e.g., the first UE 506-1) while randomizing interference imposed on other UEs (e.g., the second UE 506-2 and the third UE 506-3) without requiring that the RHS-TRP 504 have accurate location and/or direction information about the other UEs.

In some aspects, a cycling subset of holographic patterns (e.g., a subset of the holographic patterns used to generate the first set of beams 508-1 through the third set of beams 508-3) may be selected by the RHS-TRP 504, such a for a purpose of avoiding interference in a given direction, among other examples. For example, as indicated by reference number 510, the network entity 502 and the RHS-TRP 504 may be in communication via a control link, and/or the network entity 502 and the RHS-TRP 504 may exchange control information associated with cycling through a set of holographic patterns during a transmission by the RHS-TRP 504. In this way, the network entity 502 may implicitly configure the RHS-TRP 504 to use a certain holographic pattern set, such as by signaling certain cycling parameters (sometimes referred to herein as BWVC parameters) associated with the RHS-TRP 504 cycling through the set of holographic patterns.

For example, in some aspects, the network entity 502 may signal to the RHS-TRP 504 an indication of a surface-power constraint (e.g., a surface-power threshold) associated with a transmission. In such aspects, the RHS-TRP 504 may select an optimal holographic pattern and one or more companion holographic patterns for the transmission that satisfy the surface power constraint. Additionally, or alternatively, the network entity 502 may signal to the RHS-TRP 504 an indication of safe and/or protected zone (e.g., a direction in which interference is to be minimized). In such aspects, the RHS-TRP 504 may select an optimal holographic pattern and one or more companion holographic patterns for the transmission that minimize interference levels in the safe and/or protected zone. For example, returning to the example 500, the network entity 502 may signal to the RHS-TRP 504 (e.g., via the control link indicated by reference number 510) that a particular direction and/or a particular zone associated with the second UE 506-2 is to be protected, such as for a purpose of minimizing interference at the second UE 506-2. In such aspects, the RHS-TRP 504 may only cycle through holographic patterns that generate sidelobes that do not interfere with the second UE 506-2, and thus the RHS-TRP 504 may omit using any holographic patterns that generate prominent sidelobes that point to the second UE 506-2. More particularly, the RHS-TRP 504 may forgo using a holographic pattern that generates the first set of beams 508-1, because the first set of beams 508-1 includes a prominent sidelobe that points in the direction of the second UE 506-2 (e.g., the first set of beams 508-1 includes a prominent sidelobe that points in a safe and/or protected direction, as signaled by the network entity 502). Accordingly, when performing a transmission with the first UE 506-1 in this example, the RHS-TRP 504 may cycle through a holographic pattern that generates the second set of beams 508-2 and a holographic pattern that generates the third set of beams 508-3.

In some aspects, the holographic patterns used to generate the sets of beams 508 may be determined on-the-fly by the RHS-TRP 504. That is, the RHS-TRP 504 may dynamically determine a sufficient sets of beams 508 to be used to serve the first UE 506-1 using an on-board algorithm, or the like, which may avoid a requirement of storing and signaling a large set of holographic patterns between network entities. In some other aspects, the holographic patterns used to generate the sets of beams 508 may be pre-determined and/or stored at the RHS-TRP 504, such as by the RHS-TRP 504 storing a surface-power-constrained RHS codebook. In such aspects, each codeword in the RHS codebook may correspond to an optimal holographic pattern (e.g., the holographic pattern used to generate the first set of beams 508-1) for a given target direction and/or a given surface-power constraint (e.g., a given quantity of PIN diodes in an ON state), among other parameters. Moreover, each codeword may be associated with one or more companion holographic patterns (e.g., the holographic pattern used to generated the second set of beams 508-2 and the third set of beams 508-3) satisfying a same surface-power constraints as the optimal holographic pattern and/or that have similar main-lobe-pointing directions as the optimal holographic pattern, similar main-lobe widths as the optimal holographic pattern (e.g., main-lobe beam widths within a threshold of a width of the main lobe of the optimal holographic pattern), and/or similar main-lobe peak gains as the optimal holographic pattern (e.g., main-lobe peak gains that are within a threshold of a peak gain of the main lobe of the optimal holographic pattern), among other examples.

Additional aspects of control information that may be exchanged between a network entity (e.g., the network entity 502) and a TRP (e.g., the RHS-TRP 504) and/or the TRP cycling through a set of beamforming weight-vectors (e.g., a set of holographic patterns) accordingly are described in more detail below in connection with FIG. 6.

As indicated above, FIG. 5 is provided as an example. Other examples may differ from what is described with respect to FIG. 5.

Figure 6:
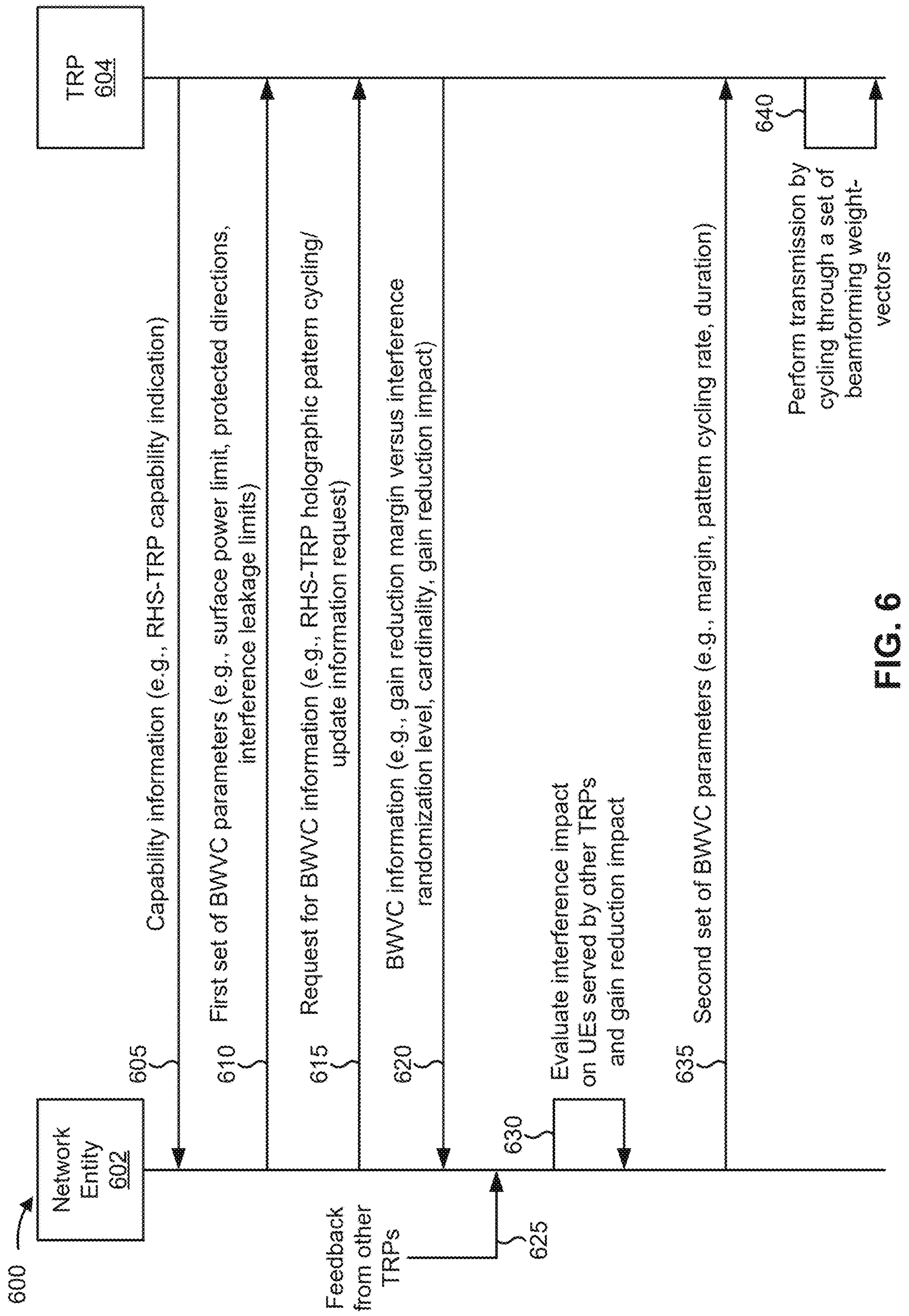
FIG. 6 is a diagram of an example associated with beamforming weight-vectors selection and cycling, in accordance with the present disclosure.

FIG. 6 is a diagram of an example 600 associated with beamforming weight-vectors selection and cycling, in accordance with the present disclosure. As shown in FIG. 6, a network entity 602 (e.g., network entity 502, a network node 110, a CU, a DU, and/or an RU) may communicate with a TRP 604 (e.g., RHS-TRP 504, a network node 110, a DU, and/or an RU). In some aspects, the network entity 602 and the TRP 604 may be part of a wireless network (e.g., wireless communication network 100). The network entity 602 and the TRP 604 may have established a wireline and/or wireless connection prior to operations shown in FIG. 6 (e.g., via the control link described above in connection with reference number 510).

In some aspects, the TRP 604 may be configured to communicate with one or more UEs (e.g., one or more UEs 506 and/or one or more UEs 120). For example, the TRP 604 may be configured to communicate with one or more UEs using beamforming communications, such as by applying one or more beamforming weight-vectors at an array (e.g., RHS 400, RHS-array 507, and/or another antenna array) in order to form a beam (e.g., beam 408) used to communicate with one or more UEs. As used herein, a beamforming weight-vector refers to a mathematical representation used to describe a direction and strength of a beam produced by an antenna array, which may be a vector whose elements correspond to weights assigned to each antenna element in the array thereby determining how much of the signal from each antenna contributes to forming the desired beam. In some aspects, the TRP 604 may be associated with an RHS (e.g., RHS 400, RHS-array 507). In such aspects, the beamforming weight-vectors used by the TRP 604 may be associated holographic patterns for the RHS. More particularly, a given beamforming weight-vector may be a vector whose elements correspond to weights assigned to each radiation element (e.g., radiation element 404) in the RHS array (e.g., RHS 400, RHS-array 507), thereby determining how much of the reference wave leaked from each radiation element contributes to forming the desired beam (e.g., beam 408, sets of beams 508).

As shown by reference number 605, the TRP 604 may transmit, and the network entity 602 may receive, capability information. The capability information may indicate whether the TRP 604 supports a feature and/or one or more parameters related to the feature. For example, the capability information may indicate a capability and/or parameter for beamforming weight-vector cycling at the TRP 604. As another example, the capabilities report may indicate a capability and/or parameter for holographic pattern cycling at the TRP 604 (e.g., in aspects in which the TRP 604 is an RHS-TRP and/or is associated with an RHS). One or more operations described herein may be based on the capability information. For example, the TRP 604 may perform a communication in accordance with the capability information, or may receive configuration information that is in accordance with the capability information. In some aspects, the capabilities may indicate TRP 604 support for the TRP 604 performing a transmission (e.g., to a UE 506) by cycling through a set of beamforming weight-vectors based at least in part on the one or more BWVC parameters signaled to the TRP 604 by the network entity 602 (e.g., a surface-power threshold, a protected and/or safe zone and/or direction, a BWVC duration, a BWVC rate, and/or similar parameters, which are described in more detail below).

As shown by reference number 610, the network entity 502 may transmit, and the TRP 604 may receive, an indication of a first set of one or more BWVC parameters. In some aspects, the first set of one or more BWVC parameters may indicate a surface-power threshold for a transmission to be performed by the TRP 604. For example, in aspects in which the TRP 604 is associated with an RHS (e.g., in aspects in which the TRP 604 is an RHS-TRP), the TRP 604 may generate a beam by using a holographic pattern that is associated with controlling RHS-array radiation elements (e.g., radiation elements 404) via a plurality of PIN diodes (e.g., by using two PIN diodes per radiation element, among other examples). In such aspects, the first set of BWVC parameters may include a power threshold associated with a power consumption by the plurality of PIN diodes when the TRP 604 is performing the transmission. For example, the first set of BWVC parameters may indicate a maximum quantity of PIN diodes that may be in an ON state during a transmission and/or may indicate a maximum power level consumed by all PIN diodes during the transmission, among other examples. In this way, the network entity 602 may flexibly control an amount of power consumed by the TRP 604.

Additionally, or alternatively, the first set of BWVC parameters may include peak-gain-reduction threshold for a transmission to be performed by the TRP 604. In some aspects, the peak-gain-reduction threshold may be associated with a difference in a first peak gain associated with a current beamforming weight-vector (e.g., an optimal beamforming weight-vector) and a second peak gain associated with a candidate beamforming weight-vector (e.g., a companion beamforming weight-vector). Put another way, the first set of BWVC parameters may indicate a peak-gain margin from a maximum peak gain in which beams to be cycled during a transmission are to fall within. In such aspects, the network entity 602 may ensure that the signal quality associated with the TRP 604 does not detrimentally suffer when the TRP 604 is performing a transmission by cycling through a set of beamforming weight-vectors.

Additionally, or alternatively, the first set of BWVC parameters may include one or more protected directions during a transmission to be performed by the TRP (e.g., one or more directions which are not to align with a prominent sidelobe for a set of beams to be used during the transmission), interference leakage limits during a transmission to be performed by the TRP (e.g., a gain level threshold for a sidelobe for a set of beams to be used during the transmission), and/or similar BWVC parameters. In such aspects, the network entity 602 may be capable of protecting high-priority communications, such as by indicating that beamforming weight-vectors that produce prominent sidelobes that may affect high-priority communications are not to be used by the TRP 604.

In some aspects, as indicated by reference number 615, the network entity 602 may transmit, and the TRP 604 may receive, a request for BWVC information. In aspects in which the TRP 604 is associated with an RHS (e.g., in aspects in which the TRP 604 is an RHS-TRP), the request for the BWVC information may be referred to a holographic pattern cycling and/or update information request. As indicated by reference number 620, based at least in part on receiving the request for BWVC information, the TRP 604 may transmit, and the network entity 602 may receive, BWVC information. For example, in some aspects, the TRP 604 may transmit, to the network entity 602 and based at least in part on the request for the BWVC information, an indication of at least one of a cardinality of one or more candidate sets of beamforming weight-vectors (e.g., the set of holographic patterns used to generate the sets of beams 508 described above in connection with FIG. 5) to be used by the TRP 604 when the TRP 604 is performing a transmission, interference randomization levels of the one or more candidate sets of beamforming weight-vectors to be used by the TRP 604 when the TRP 604 is performing the transmission, a gain reduction impact associated with one or more candidate sets of beamforming weight-vectors (e.g., a decrease in a peak gain associated with transmissions to a UE if the sets of beamforming weight-vectors are used to transmit communications to the UE, as compared to a peak gain of a current beam being used to communicate with the UE), an indication of a gain reduction margin versus an interference randomization level associated with one or more candidate sets of beamforming weight-vectors, among other information. In this way, the network entity 602 may receive additional information used to implicitly or explicitly configure BWVC at the TRP 604 (described in more detail below in connection with reference numbers 630 and 635), thus resulting in more efficient network operations.

In some aspects, the BWVC information may include multiple candidate sets of beamforming weight-vectors and, for each candidate set of beamforming weight-vectors, an indication of corresponding metrics and/or attributes associated with the candidate set of beamforming weight-vectors. For example, in some aspects, the TRP 604 may report, to the network entity 602, a cardinality of one or more sets of companion beamforming weight-vectors (e.g., companion holographic patterns) satisfying one or more thresholds or similar information signaled to the TRP 604 via the first set of BWVC parameters described above in connection with reference number 610, interference randomization levels indicative of the average interference to unintended directions imposed by each of the one or more sets of companion holographic patterns, and/or similar information. Put another way, in some aspects, the TRP 604 may transmit, to network entity 602, and based at least in part on the request for the BWVC information, a cardinality of one or more candidate sets of beamforming weight-vectors to be used by the TRP when the TRP is performing the transmission accordingly, or interference randomization levels of the one or more candidate sets of beamforming weight-vectors to be used by the TRP when the TRP is performing the transmission. In this way, the network entity 602 may receive multiple candidate sets of beamforming weight-vectors and associated attributes of each candidate set of beamforming weight vectors, thereby providing even more information used to implicitly or explicitly configure BWVC at the TRP 604 (described in more detail below in connection with reference numbers 630 and 635), thus resulting in more efficient network operations.

In some aspects, the TRP 604 may itself select one or more BWVC parameters (e.g., one or more thresholds) to be used for selecting candidate beamforming weight-vectors. For example, in some aspects, the first set of BWVC parameters described above in connection with reference number 610 and/or the request for BWVC information described above in connection with reference number 615 may include a default indication (e.g., a default threshold value) that indicates that TRP 604 is to select one or more BWVC parameters (e.g., one or more thresholds) and, for each selected BWVC parameter, report the network entity 602 cardinality of a companion set of beamforming weight-vectors (e.g., a companion set of holographic patterns), a corresponding BWVC parameter (e.g., a corresponding threshold value), and/or an average interference level associated with the companion set of beamforming weight-vectors, among other information. Put another way, in some aspects, the TRP 604 may transmit, to the network entity 602, based at least in part on the request for the BWVC information, and/or for each candidate threshold level, of multiple candidate threshold levels selected by the TRP 604, an indication of at least one of a corresponding candidate threshold level, a cardinality of one or more candidate sets of beamforming weight-vectors (e.g., candidate sets of holographic patterns) to be used by the TRP 604 when the TRP 604 is performing the transmission according to the corresponding candidate threshold level, and/or interference randomization levels of the one or more candidate sets of beamforming weight-vectors to be used by the TRP when the TRP is performing the transmission according to the corresponding candidate threshold level. In this way, the network entity 602 may be provided with sufficient information as to implicitly or explicitly configure the TRP 604 to perform BWVC with reduced signaling overhead as compares to aspects in which multiple BWVC parameters are signaled to the TRP 604 by the network entity 602.

In some aspects, the BWVC information may include an indication of a change in service to one or more wireless communication devices served by the TRP 604 (e.g., the first UE 506-1) by the TRP 604 communicating with the one or more wireless communication devices by cycling through beamforming weight-vectors (e.g., by cycling through beams) rather than serving the one or more wireless communication devices using a strongest beam available. That is, the TRP 604 may report, to the network entity 602, utility change computed over its served users (e.g., served UEs) for different choices of companion sets, pattern cycling duration, cycling rates, and/or similar information. In such aspects, in the communications shown in connection with reference number 620, the TRP 604 may transmit, to the network entity 602 and based at least in part on the request for the BWVC information, an indication of one or more candidate sets of beamforming weight-vectors (e.g., one or more candidate sets of holographic patterns) to be used by the TRP 604 when the TRP 604 is performing the transmission, and, for each candidate set of beamforming weight-vectors, a change in a service level to one or more UEs served by the TRP 604.

In this regard, in some aspects, the one or more wireless communication devices served by the TRP 604 may be configured to report signal strength measurements to the TRP 604. That is, in some aspects, the TRP 604 may receive, from a UE served by the TRP 604 (e.g., the first UE 506-1), a first indication that a signal strength associated with UE is below a signal-strength threshold when the TRP 604 is performing the transmission by cycling through beamforming weight-vectors (e.g., by cycling through holographic patterns), and/or the TRP 604 may transmit, to the network entity 602, a second indication that the signal strength associated with UE is below the signal-strength threshold when the TRP 604 is performing the transmission. Put another way, a served UE (e.g., the first UE 506-1) may be configured to report additional signal strength measurement if the UE's signal strength measured over a configured second time-frequency window falls below a threshold or margin compared to the signal strength measured over a configured first time-frequency window, such as for a purpose of the TRP 604 providing feedback to the network entity 602 regarding a change in service to the UE by cycling through the beamforming weight-vectors (e.g., by cycling through the holographic patterns).

In a similar manner, and as indicated by reference number 625, in some aspects the network entity 602 may receive feedback from other TRPs regarding a change in service to one or more wireless communication devices served the other TRPs (e.g., the second UE 506-2 and/or the third UE 506-3) when the TRP 604 is cycling through the beamforming weight-vectors and/or when the other TRPs are cycling through beamforming weight-vectors. Put another way, in some aspects, the network entity 602 may obtain utility change information computed over UEs served by other cells for different choices of companion sets and cycling duration and rates applied by the TRP 604. In this way, the network entity 602 may be provided with information as to service disruptions at various UEs and/or similar wireless communication devices, which may enable the network entity 602 to select certain BWVC parameters that minimize service degradation at the UEs and thus resulting in more efficient usage of network resources.

As indicated by reference number 630, the network entity 602 may evaluate the BWVC information received from the TRP 604, feedback received from other TRPs, and/or similar information, and/or may determine additional BWVC parameters to be signaled to the TRP 604. For example, the network entity 602 may determine service level impacts to one or more UEs (e.g., the first UE 506-1 through the third UE 506-3) caused the by TRP 604 and/or other TRPs cycling through beamforming weight-vectors (e.g., cycling through holographic patterns) when performing a transmission, and thus the network entity 602 may select certain BWVC parameters to be used by the TRP 604, such as a chosen set of companion beamforming weight-vectors (e.g., a chosen set of companion holographic patterns) to be used by the TRP 604, a cycling rate to be used by the TRP 604, a cycling duration to be used by the TRP 604, and/or similar BWVC parameters. In such aspects, and as indicated by reference number 635, the network entity 602 may signal the additional BWVC parameters to the TRP 604. More particularly, the network entity 602 may transmit, to the TRP 604 and based at least in part on the BWVC information, an indication of a second set of BWVC parameters. For example, the second set of BWVC parameters may include a set of beamforming weight-vectors to be used by the TRP 604 when performing a transmission by cycling through the set of beamforming weight-vectors, a duration for cycling through the set of beamforming weight-vectors when the TRP 604 is performing the transmission, and/or a cycling rate for cycling through the set of beamforming weight-vectors when the TRP 604 is performing the transmission, among other information. In this way, the network entity 602 may implicitly configure the TRP 604 to select a set of beamforming weight-vectors that may result in a greatest interference randomization level and/or greatest power savings without degrading service to various wireless communication devices.

As indicated by reference number 640, the TRP 604 may perform a transmission (e.g., communicate with the first UE 506-1) by cycling through a set of beamforming weight-vectors (e.g., a set of holographic patterns) based at least in part on the one or more BWVC parameters (e.g., the parameters signaled to the TRP 604 via the first set of BWVC parameters described above in connection with reference number 610 and/or via the second set of BWVC parameters described above in connection with reference number 635). As used herein, "cycling through" refers to a process of sequentially applying a set of options and/or configurations. In this way, "cycling through a set of beamforming weight-vectors" means the TRP 604 may perform a transmission by sequentially applying (e.g., one after another) each beamforming weight-vector, of the set of beamforming weight-vectors, during the transmission process.

In this way, the TRP 604 may randomize interference caused by prominent sidelobes associated with each beamforming weight-vector from the set of beamforming weight-vectors, may avoid interfering with any protected directions or protected zones, and/or may conserve power by transmitting communications in line with a given surface-power threshold, among other examples. As described above in connection with example 500, in some aspects the TRP 604 may compute the set of beamforming weight-vectors based at least in part on the one or more BWVC parameters (e.g., the TRP 604 may determine the set of beamforming weight-vectors on the fly using the BWVC parameters signaled to the TRP 604 by the network entity 602). In some other aspects, the TRP 604 may select the set of beamforming weight-vectors from multiple candidate beamforming weight-vectors stored at the TRP 604. For example, the TRP 604 may store a codebook, with each word in the codebook corresponding to an optimal beamforming weight-vector for a given target direction and/or a given surface-power constraint (e.g., a given quantity of PIN diodes in an ON state), among other parameters. Moreover, each codeword may be associated with one or more companion beamforming weight-vectors satisfying a same surface-power constraint as the optimal beamforming weight-vector and/or that have similar beam-pointing directions as the optimal beamforming weight-vector, similar main-lobe widths as the optimal beamforming weight-vector (e.g., main-lobe beam widths within a threshold of a width of the main lobe of the optimal beamforming weight-vector), and/or similar main-lobe peak gains as the optimal beamforming weight-vector (e.g., main-lobe peak gains that are within a threshold of a peak gain of the main lobe of the optimal beamforming weight-vector), among other examples.

In some aspects, performing the transmission by cycling through the set of beamforming weight-vectors may include transmitting, to a UE, a set of signals, with each signal, of the set of signals, being transmitted using a beamforming weight-vector, of the set of beamforming weight-vectors, receiving, from the UE, an indication of a signal, of the set of signals, that is associated with a highest signal strength, and/or transmitting, to the UE, a communication using a corresponding beamforming weight-vector based at least in part on a beamforming weight-vector that was used to transmit the signal associated with the highest signal strength. For example, in aspects in which the TRP 604 is associated with an RHS (e.g., in aspects in which the TRP 604 is an RHS-TRP), the TRP 604 may apply sequentially a set of holographic patterns, each satisfying set power limit, and system performance may be measured at one or more served UEs. The one or more served UEs may transmit, to the TRP 604, a feedback message including an indication of the best pattern for the corresponding UE (e.g., with or without the value of the measured performance parameter). The TRP 604 may thus use a holographic pattern to serve a chosen UE that is a function of the UE's reported best pattern and associated measurements. In this way, wireless communication channels between the TRP 604 and the one or more served UEs may improve, resulting in more efficient network operations.

Based at least in part on the network entity 602 signaling one or more BWVC parameters to the TRP 604 and/or the TRP 604 performing a transmission by cycling through a set of beamforming weight-vectors, the network entity 602 and/or the TRP 604 may conserve computing, power, network, and/or communication resources that may have otherwise been consumed by conventional beamforming techniques. For example, based at least in part on the network entity 602 signaling one or more BWVC parameters to the TRP 604 and/or the TRP 604 performing a transmission by cycling through a set of beamforming weight-vectors, the network entity 602 and/or the TRP 604 may communicate with randomized interference levels and thus reduced error rates, which may conserve computing, power, network, and/or communication resources that may have otherwise been consumed to detect and/or correct communication errors.

As indicated above, FIG. 6 is provided as an example. Other examples may differ from what is described with respect to FIG. 6.

Figure 7:
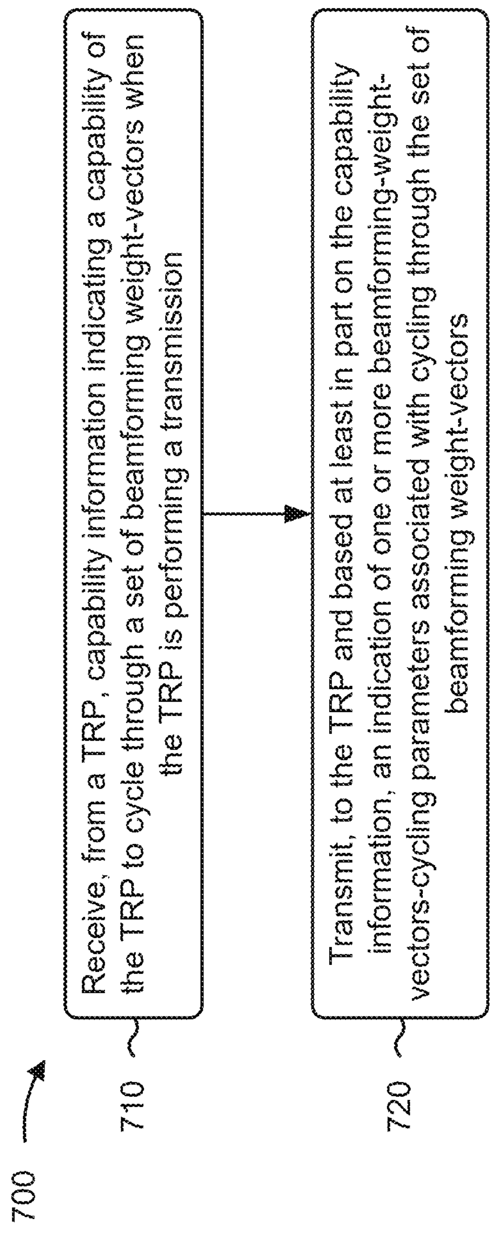
FIG. 7 is a diagram illustrating an example process performed, for example, at a network node or an apparatus of a network node, in accordance with the present disclosure.

FIG. 7 is a diagram illustrating an example process 700 performed, for example, at a network node or an apparatus of a network node, in accordance with the present disclosure. Example process 700 is an example where the apparatus or the network node (e.g., network node 110 and/or network entity 602) performs operations associated with beamforming weight-vectors selection and cycling.

As shown in FIG. 7, in some aspects, process 700 may include receiving, from a TRP, capability information indicating a capability of the TRP to cycle through a set of beamforming weight-vectors when the TRP is performing a transmission (block 710). For example, the network node (e.g., using reception component 902 and/or communication manager 906, depicted in FIG. 9) may receive, from a TRP, capability information indicating a capability of the TRP to cycle through a set of beamforming weight-vectors when the TRP is performing a transmission, as described above.

As further shown in FIG. 7, in some aspects, process 700 may include transmitting, to the TRP and based at least in part on the capability information, an indication of one or more beamforming-weight-vectors-cycling parameters associated with cycling through the set of beamforming weight-vectors (block 720). For example, the network node (e.g., using transmission component 904 and/or communication manager 906, depicted in FIG. 9) may transmit, to the TRP and based at least in part on the capability information, an indication of one or more beamforming-weight-vectors-cycling parameters associated with cycling through the set of beamforming weight-vectors, as described above.

Process 700 may include additional aspects, such as any single aspect or any combination of aspects described below and/or in connection with one or more other processes described elsewhere herein.

In a first aspect, the TRP is associated with an RHS, and the set of beamforming weight-vectors are associated with a set of holographic patterns for the RHS.

In a second aspect, alone or in combination with the first aspect, the set of holographic patterns are associated with controlling RHS-array radiation elements via a plurality of PIN diodes, and the one or more beamforming-weight-vectors-cycling parameters include a power threshold associated with a power consumption by the plurality of PIN diodes when the TRP is performing the transmission.

In a third aspect, alone or in combination with one or more of the first and second aspects, process 700 includes transmitting, to the TRP, a request for beamforming-weight-vectors-cycling information.

In a fourth aspect, alone or in combination with one or more of the first through third aspects, process 700 includes receiving, from the TRP and based at least in part on the request for the beamforming-weight-vectors-cycling information, an indication of at least one of a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

In a fifth aspect, alone or in combination with one or more of the first through fourth aspects, process 700 includes receiving, from the TRP, based at least in part on the request for the beamforming-weight-vectors-cycling information, and for each candidate threshold level, of multiple candidate threshold levels selected by the TRP, an indication of at least one of a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

In a sixth aspect, alone or in combination with one or more of the first through fifth aspects, process 700 includes receiving, from the TRP and based at least in part on the request for the beamforming-weight-vectors-cycling information, an indication of one or more candidate sets of beamforming weight-vectors to be used by the TRP when the TRP is performing the transmission, selecting the set of beamforming weight-vectors from the one or more candidate sets of beamforming weight-vectors, and transmitting, to the TRP, an indication of at least one of the set of beamforming weight-vectors, a duration for cycling through the set of beamforming weight-vectors when the TRP is performing the transmission, or a cycling rate for cycling through the set of beamforming weight-vectors when the TRP is performing the transmission.

In a seventh aspect, alone or in combination with one or more of the first through sixth aspects, process 700 includes receiving, from the TRP and based at least in part on the request for the beamforming-weight-vectors-cycling information, an indication of one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more UEs served by the TRP.

In an eighth aspect, alone or in combination with one or more of the first through seventh aspects, process 700 includes receiving, from another TRP, an indication of a change in a service level to one or more other UEs served by the other TRP, and selecting the set of beamforming weight-vectors from the one or more candidate sets of beamforming weight-vectors based at least in part on the indication of the change in the service level to the one or more UEs served by the TRP and the indication of the change in the service level to the one or more other UEs served by the other TRP.

In a ninth aspect, alone or in combination with one or more of the first through eighth aspects, the one or more beamforming-weight-vectors-cycling parameters include a peak-gain-reduction threshold associated with a difference in a first peak gain associated with a current beamforming weight-vector and a second peak gain associated with a candidate beamforming weight-vector.

In a tenth aspect, alone or in combination with one or more of the first through ninth aspects, process 700 includes receiving, from the TRP, an indication that a signal strength associated with a user equipment served by the TRP is below a signal-strength threshold when the TRP is performing the transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
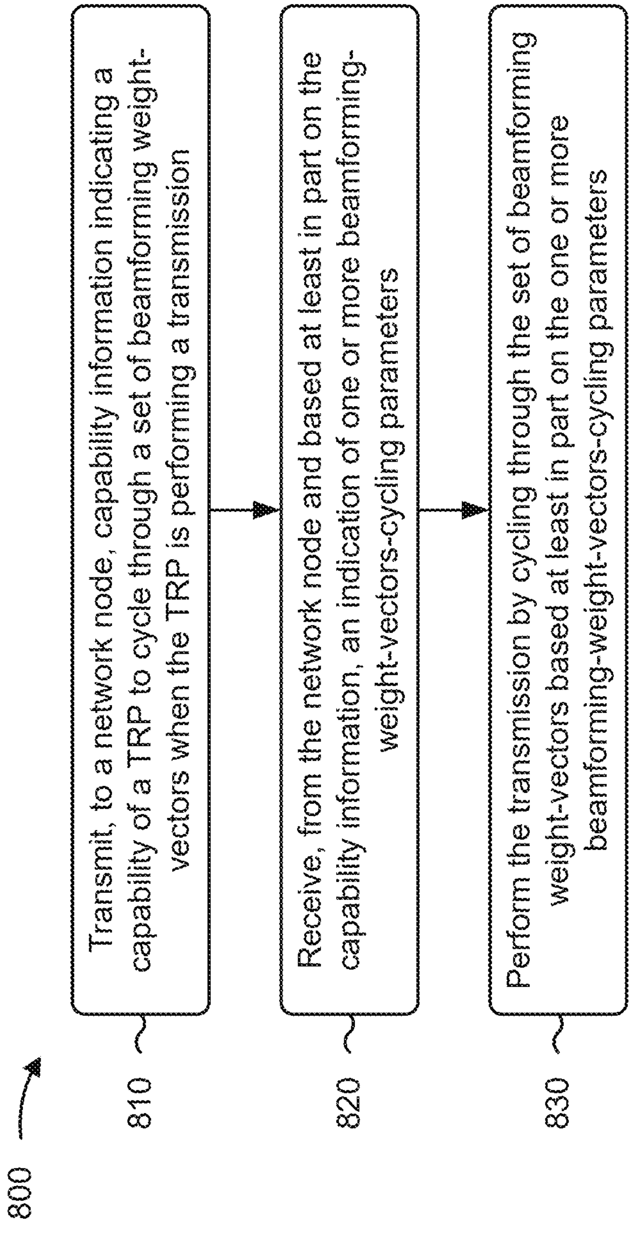
FIG. 8 is a diagram illustrating an example process performed, for example, at a transmission reception point (TRP) or an apparatus of a TRP, in accordance with the present disclosure.

FIG. 8 is a diagram illustrating an example process 800 performed, for example, at a TRP or an apparatus of a TRP, in accordance with the present disclosure. Example process 800 is an example where the apparatus or the TRP (e.g., network node 110 and/or TRP 604) performs operations associated with beamforming weight-vectors selection and cycling.

As shown in FIG. 8, in some aspects, process 800 may include transmitting, to a network node, capability information indicating a capability of the TRP to cycle through a set of beamforming weight-vectors when the TRP is performing a transmission (block 810). For example, the TRP (e.g., using transmission component 904 and/or communication manager 906, depicted in FIG. 9) may transmit, to a network node, capability information indicating a capability of the TRP to cycle through a set of beamforming weight-vectors when the TRP is performing a transmission, as described above.

As further shown in FIG. 8, in some aspects, process 800 may include receiving, from the network node and based at least in part on the capability information, an indication of one or more beamforming-weight-vectors-cycling parameters (block 820). For example, the TRP (e.g., using reception component 902 and/or communication manager 906, depicted in FIG. 9) may receive, from the network node and based at least in part on the capability information, an indication of one or more beamforming-weight-vectors-cycling parameters, as described above.

As further shown in FIG. 8, in some aspects, process 800 may include performing the transmission by cycling through the set of beamforming weight-vectors based at least in part on the one or more beamforming-weight-vectors-cycling parameters (block 830). For example, the TRP (e.g., using communication manager 906, depicted in FIG. 9) may perform the transmission by cycling through the set of beamforming weight-vectors based at least in part on the one or more beamforming-weight-vectors-cycling parameters, as described above.

Process 800 may include additional aspects, such as any single aspect or any combination of aspects described below and/or in connection with one or more other processes described elsewhere herein.

In a first aspect, the TRP is associated with an RHS, and the set of beamforming weight-vectors are associated with a set of holographic patterns for the RHS.

In a second aspect, alone or in combination with the first aspect, the set of holographic patterns are associated with controlling RHS-array radiation elements via a plurality of PIN diodes, and the one or more beamforming-weight-vectors-cycling parameters include a power threshold associated with a power consumption by the plurality of PIN diodes when the TRP is performing the transmission.

In a third aspect, alone or in combination with one or more of the first and second aspects, process 800 includes receiving, from the network node, a request for beamforming-weight-vectors-cycling information.

In a fourth aspect, alone or in combination with one or more of the first through third aspects, process 800 includes transmitting, to the network node and based at least in part on the request for the beamforming-weight-vectors-cycling information, an indication of at least one of a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

In a fifth aspect, alone or in combination with one or more of the first through fourth aspects, process 800 includes transmitting, to the network node, based at least in part on the request for the beamforming-weight-vectors-cycling information, and for each candidate threshold level, of multiple candidate threshold levels selected by the TRP, an indication of at least one of a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

In a sixth aspect, alone or in combination with one or more of the first through fifth aspects, process 800 includes transmitting, to the network node and based at least in part on the request for the beamforming-weight-vectors-cycling information, an indication of one or more candidate sets of beamforming weight-vectors to be used by the TRP when the TRP is performing the transmission, and receiving, from the network node, an indication of at least one of the set of beamforming weight-vectors, a duration for cycling through the set of beamforming weight-vectors when the TRP is performing the transmission, or a cycling rate for cycling through the set of beamforming weight-vectors when the TRP is performing the transmission.

In a seventh aspect, alone or in combination with one or more of the first through sixth aspects, process 800 includes transmitting, to the network node and based at least in part on the request for the beamforming-weight-vectors-cycling information, an indication of one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more UEs served by the TRP.

In an eighth aspect, alone or in combination with one or more of the first through seventh aspects, the one or more beamforming-weight-vectors-cycling parameters include a peak-gain-reduction threshold associated with a difference in a first peak gain associated with a current beamforming weight-vector and a second peak gain associated with a candidate beamforming weight-vector.

In a ninth aspect, alone or in combination with one or more of the first through eighth aspects, process 800 includes receiving, from a UE served by the TRP, a first indication that a signal strength associated with UE is below a signal-strength threshold when the TRP is performing the transmission, and transmitting, to the network node, a second indication that the signal strength associated with UE is below the signal-strength threshold when the TRP is performing the transmission.

In a tenth aspect, alone or in combination with one or more of the first through ninth aspects, process 800 includes computing the set of beamforming weight-vectors based at least in part on the indication of the one or more beamforming-weight-vectors-cycling parameters.

In an eleventh aspect, alone or in combination with one or more of the first through tenth aspects, performing the transmission by cycling through the set of beamforming weight-vectors includes transmitting, to UE, a set of signals, wherein each signal, of the set of signals, is transmitted using a beamforming weight-vector, of the set of beamforming weight-vectors, receiving, from the UE, an indication of a signal, of the set of signals, that is associated with a highest signal strength, and transmitting, to the UE, a communication using a corresponding beamforming weight-vector based at least in part on a beamforming weight-vector that was used to transmit the signal associated with the highest signal strength.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
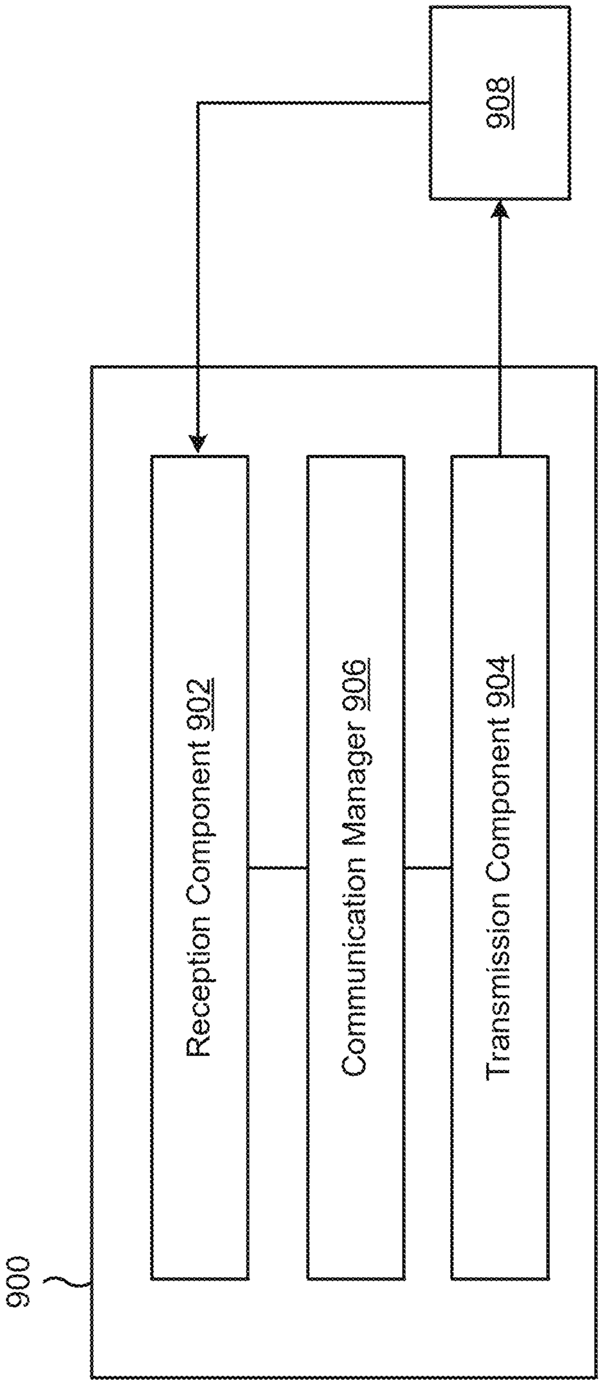
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node (e.g., network node 110, network entity 602, and/or TRP 604), or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the network node 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network node 110 described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network node 110 described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a TRP, capability information indicating a capability of the TRP to cycle through a set of beamforming weight-vectors when the TRP is performing a transmission. The transmission component 904 may transmit, to the TRP and based at least in part on the capability information, an indication of one or more beamforming-weight-vectors-cycling parameters associated with cycling through the set of beamforming weight-vectors.

The transmission component 904 may transmit, to the TRP, a request for beamforming-weight-vectors-cycling information.

The reception component 902 may receive, from the TRP and based at least in part on the request for the beamforming-weight-vectors-cycling information, an indication of at least one of a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

The reception component 902 may receive, from the TRP, based at least in part on the request for the beamforming-weight-vectors-cycling information, and for each candidate threshold level, of multiple candidate threshold levels selected by the TRP, an indication of at least one of a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

The reception component 902 may receive, from the TRP and based at least in part on the request for the beamforming-weight-vectors-cycling information, an indication of one or more candidate sets of beamforming weight-vectors to be used by the TRP when the TRP is performing the transmission.

The communication manager 906 may select the set of beamforming weight-vectors from the one or more candidate sets of beamforming weight-vectors.

The transmission component 904 may transmit, to the TRP, an indication of at least one of the set of beamforming weight-vectors, a duration for cycling through the set of beamforming weight-vectors when the TRP is performing the transmission, or a cycling rate for cycling through the set of beamforming weight-vectors when the TRP is performing the transmission.

The reception component 902 may receive, from the TRP and based at least in part on the request for the beamforming-weight-vectors-cycling information, an indication of one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more UEs served by the TRP.

The reception component 902 may receive, from another TRP, an indication of a change in a service level to one or more other UEs served by the other TRP.

The communication manager 906 may select the set of beamforming weight-vectors from the one or more candidate sets of beamforming weight-vectors based at least in part on the indication of the change in the service level to the one or more UEs served by the TRP and the indication of the change in the service level to the one or more other UEs served by the other TRP.

The reception component 902 may receive, from the TRP, an indication that a signal strength associated with a user equipment served by the TRP is below a signal-strength threshold when the TRP is performing the transmission.

The transmission component 904 may transmit, to a network node, capability information indicating a capability of the TRP to cycle through a set of beamforming weight-vectors when the TRP is performing a transmission. The reception component 902 may receive, from the network node and based at least in part on the capability information, an indication of one or more beamforming-weight-vectors-cycling parameters. The communication manager 906 may perform the transmission by cycling through the set of beamforming weight-vectors based at least in part on the one or more beamforming-weight-vectors-cycling parameters.

The reception component 902 may receive, from the network node, a request for beamforming-weight-vectors-cycling information.

The transmission component 904 may transmit, to the network node and based at least in part on the request for the beamforming-weight-vectors-cycling information, an indication of at least one of a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

The transmission component 904 may transmit, to the network node, based at least in part on the request for the beamforming-weight-vectors-cycling information, and for each candidate threshold level, of multiple candidate threshold levels selected by the TRP, an indication of at least one of a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

The transmission component 904 may transmit, to the network node and based at least in part on the request for the beamforming-weight-vectors-cycling information, an indication of one or more candidate sets of beamforming weight-vectors to be used by the TRP when the TRP is performing the transmission.

The reception component 902 may receive, from the network node, an indication of at least one of the set of beamforming weight-vectors, a duration for cycling through the set of beamforming weight-vectors when the TRP is performing the transmission, or a cycling rate for cycling through the set of beamforming weight-vectors when the TRP is performing the transmission.

The transmission component 904 may transmit, to the network node and based at least in part on the request for the beamforming-weight-vectors-cycling information, an indication of one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more user equipments served by the TRP.

The reception component 902 may receive, from a UE served by the TRP, a first indication that a signal strength associated with UE is below a signal-strength threshold when the TRP is performing the transmission.

The transmission component 904 may transmit, to the network node, a second indication that the signal strength associated with UE is below the signal-strength threshold when the TRP is performing the transmission.

The communication manager 906 may compute the set of beamforming weight-vectors based at least in part on the indication of the one or more beamforming-weight-vectors-cycling parameters.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a network node, comprising: receiving, from a transmission reception point (TRP), capability information indicating a capability of the TRP to cycle through a set of beamforming weight-vectors when the TRP is performing a transmission; and transmitting, to the TRP and based at least in part on the capability information, an indication of one or more beamforming-weight-vectors-cycling parameters associated with cycling through the set of beamforming weight-vectors.

Aspect 2: The method of Aspect 1, wherein the TRP is associated with a reconfigurable holographic surface (RHS), and wherein the set of beamforming weight-vectors are associated with a set of holographic patterns for the RHS.

Aspect 3: The method of Aspect 2, wherein the set of holographic patterns are associated with controlling RHS-array radiation elements via a plurality of positive-intrinsic-negative (PIN) diodes, and wherein the one or more beamforming-weight-vectors-cycling parameters include a power threshold associated with a power consumption by the plurality of PIN diodes when the TRP is performing the transmission.

Aspect 4: The method of any of Aspects 1-3, further comprising transmitting, to the TRP, a request for beamforming-weight-vectors-cycling information.

Aspect 5: The method of Aspect 4, further comprising receiving, from the TRP and based at least in part on the request for the beamforming-weight-vectors-cycling information, an indication of at least one of: a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

Aspect 6: The method of Aspect 4, further comprising receiving, from the TRP, based at least in part on the request for the beamforming-weight-vectors-cycling information, and for each candidate threshold level, of multiple candidate threshold levels selected by the TRP, an indication of at least one of: a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

Aspect 7: The method of Aspect 4, further comprising: receiving, from the TRP and based at least in part on the request for the beamforming-weight-vectors-cycling information, an indication of one or more candidate sets of beamforming weight-vectors to be used by the TRP when the TRP is performing the transmission; selecting the set of beamforming weight-vectors from the one or more candidate sets of beamforming weight-vectors; and transmitting, to the TRP, an indication of at least one of: the set of beamforming weight-vectors, a duration for cycling through the set of beamforming weight-vectors when the TRP is performing the transmission, or a cycling rate for cycling through the set of beamforming weight-vectors when the TRP is performing the transmission.

Aspect 8: The method of Aspect 4, further comprising receiving, from the TRP and based at least in part on the request for the beamforming-weight-vectors-cycling information, an indication of: one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more user equipments (UEs) served by the TRP.

Aspect 9: The method of Aspect 8, further comprising: receiving, from another TRP, an indication of a change in a service level to one or more other UEs served by the other TRP; and selecting the set of beamforming weight-vectors from the one or more candidate sets of beamforming weight-vectors based at least in part on the indication of the change in the service level to the one or more UEs served by the TRP and the indication of the change in the service level to the one or more other UEs served by the other TRP.

Aspect 10: The method of any of Aspects 1-9, wherein the one or more beamforming-weight-vectors-cycling parameters include a peak-gain-reduction threshold associated with a difference in a first peak gain associated with a current beamforming weight-vector and a second peak gain associated with a candidate beamforming weight-vector.

Aspect 11: The method of any of Aspects 1-10, further comprising receiving, from the TRP, an indication that a signal strength associated with a user equipment served by the TRP is below a signal-strength threshold when the TRP is performing the transmission.

Aspect 12: A method of wireless communication performed by a transmission reception point (TRP), comprising: transmitting, to a network node, capability information indicating a capability of the TRP to cycle through a set of beamforming weight-vectors when the TRP is performing a transmission; receiving, from the network node and based at least in part on the capability information, an indication of one or more beamforming-weight-vectors-cycling parameters; and performing the transmission by cycling through the set of beamforming weight-vectors based at least in part on the one or more beamforming-weight-vectors-cycling parameters.

Aspect 13: The method of Aspect 12, wherein the TRP is associated with a reconfigurable holographic surface (RHS), and wherein the set of beamforming weight-vectors are associated with a set of holographic patterns for the RHS.

Aspect 14: The method of Aspect 13, wherein the set of holographic patterns are associated with controlling RHS-array radiation elements via a plurality of positive-intrinsic-negative (PIN) diodes, and wherein the one or more beamforming-weight-vectors-cycling parameters include a power threshold associated with a power consumption by the plurality of PIN diodes when the TRP is performing the transmission.

Aspect 15: The method of any of Aspects 12-14, further comprising receiving, from the network node, a request for beamforming-weight-vectors-cycling information.

Aspect 16: The method of Aspect 15, further comprising transmitting, to the network node and based at least in part on the request for the beamforming-weight-vectors-cycling information, an indication of at least one of: a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

Aspect 17: The method of Aspect 15, further comprising transmitting, to the network node, based at least in part on the request for the beamforming-weight-vectors-cycling information, and for each candidate threshold level, of multiple candidate threshold levels selected by the TRP, an indication of at least one of: a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

Aspect 18: The method of Aspect 15, further comprising: transmitting, to the network node and based at least in part on the request for the beamforming-weight-vectors-cycling information, an indication of one or more candidate sets of beamforming weight-vectors to be used by the TRP when the TRP is performing the transmission; and receiving, from the network node, an indication of at least one of: the set of beamforming weight-vectors, a duration for cycling through the set of beamforming weight-vectors when the TRP is performing the transmission, or a cycling rate for cycling through the set of beamforming weight-vectors when the TRP is performing the transmission.

Aspect 19: The method of Aspect 15, further comprising transmitting, to the network node and based at least in part on the request for the beamforming-weight-vectors-cycling information, an indication of: one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more user equipments served by the TRP.

Aspect 20: The method of any of Aspects 12-19, wherein the one or more beamforming-weight-vectors-cycling parameters include a peak-gain-reduction threshold associated with a difference in a first peak gain associated with a current beamforming weight-vector and a second peak gain associated with a candidate beamforming weight-vector.

Aspect 21: The method of any of Aspects 12-20, further comprising: receiving, from a user equipment (UE) served by the TRP, a first indication that a signal strength associated with UE is below a signal-strength threshold when the TRP is performing the transmission; and transmitting, to the network node, a second indication that the signal strength associated with UE is below the signal-strength threshold when the TRP is performing the transmission.

Aspect 22: The method of any of Aspects 12-21, further comprising computing the set of beamforming weight-vectors based at least in part on the indication of the one or more beamforming-weight-vectors-cycling parameters.

Aspect 23: The method of any of Aspects 12-22, wherein performing the transmission by cycling through the set of beamforming weight-vectors includes: transmitting, to a user equipment (UE), a set of signals, wherein each signal, of the set of signals, is transmitted using a beamforming weight-vector, of the set of beamforming weight-vectors; receiving, from the UE, an indication of a signal, of the set of signals, that is associated with a highest signal strength; and transmitting, to the UE, a communication using a corresponding beamforming weight-vector based at least in part on a beamforming weight-vector that was used to transmit the signal associated with the highest signal strength.

Aspect 24: The method of any of Aspects 12-23, wherein performing the transmission by cycling through the set of beamforming weight-vectors includes sequentially applying each beamforming weight-vector, of the set of beamforming weight-vectors, during the transmission.

Aspect 25: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-24.

Aspect 26: An apparatus for wireless communication at a device, the apparatus comprising one or more memories and one or more processors coupled to the one or more memories, the one or more processors configured to cause the device to perform the method of one or more of Aspects 1-24.

Aspect 27: An apparatus for wireless communication, the apparatus comprising at least one means for performing the method of one or more of Aspects 1-24.

Aspect 28: A non-transitory computer-readable medium storing code for wireless communication, the code comprising instructions executable by one or more processors to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

Aspect 30: A device for wireless communication, the device comprising a processing system that includes one or more processors and one or more memories coupled with the one or more processors, the processing system configured to cause the device to perform the method of one or more of Aspects 1-24.

Aspect 31: An apparatus for wireless communication at a device, the apparatus comprising one or more memories and one or more processors coupled to the one or more memories, the one or more processors individually or collectively configured to cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication, comprising:
one or more memories; and
one or more processors coupled to the one or more memories, the one or more processors individually or collectively configured to:
receive, from a transmission reception point (TRP), capability information indicating a capability of the TRP to cycle through a set of beamforming weight-vectors when the TRP is performing a transmission; and
transmit, to the TRP and based at least in part on the capability information, an indication of one or more beamforming-weight-vectors-cycling parameters associated with cycling through the set of beamforming weight-vectors.

2. The apparatus of claim 1, wherein the TRP is associated with a reconfigurable holographic surface (RHS), and
wherein the set of beamforming weight-vectors are associated with a set of holographic patterns for the RHS.

3. The apparatus of claim 2, wherein the set of holographic patterns are associated with controlling RHS-array radiation elements via a plurality of positive-intrinsic-negative (PIN) diodes, and
wherein the one or more beamforming-weight-vectors-cycling parameters include a power threshold associated with a power consumption by the plurality of PIN diodes when the TRP is performing the transmission.

4. The apparatus of claim 1, wherein the one or more processors are further individually or collectively configured to transmit, to the TRP, a request for beamforming-weight-vectors-cycling information.

5. The apparatus of claim 4, wherein the one or more processors are further individually or collectively configured to receive, from the TRP and based at least in part on the request for the beamforming-weight-vectors-cycling information, an indication of at least one of:
a cardinality of one or more candidate sets of beamforming weight-vectors to be used by the TRP when the TRP is performing the transmission, or interference randomization levels of the one or more candidate sets of beamforming weight-vectors to be used by the TRP when the TRP is performing the transmission.

6. The apparatus of claim 4, wherein the one or more processors are further individually or collectively configured to receive, from the TRP, based at least in part on the request for the beamforming-weight-vectors-cycling information, and for each candidate threshold level, of multiple candidate threshold levels selected by the TRP, an indication of at least one of:

a corresponding candidate threshold level, a cardinality of one or more candidate sets of beamforming weight-vectors to be used by the TRP when the TRP is performing the transmission according to the corresponding candidate threshold level, or interference randomization levels of the one or more candidate sets of beamforming weight-vectors to be used by the TRP when the TRP is performing the transmission according to the corresponding candidate threshold level.

7. The apparatus of claim 4, wherein the one or more processors are further individually or collectively configured to:

receive, from the TRP and based at least in part on the request for the beamforming-weight-vectors-cycling information, an indication of one or more candidate sets of beamforming weight-vectors to be used by the TRP when the TRP is performing the transmission;

select the set of beamforming weight-vectors from the one or more candidate sets of beamforming weight-vectors; and transmit, to the TRP, an indication of at least one of:

the set of beamforming weight-vectors, a duration for cycling through the set of beamforming weight-vectors when the TRP is performing the transmission, or a cycling rate for cycling through the set of beamforming weight-vectors when the TRP is performing the transmission.

8. The apparatus of claim 4, wherein the one or more processors are further individually or collectively configured to receive, from the TRP and based at least in part on the request for the beamforming-weight-vectors-cycling information, an indication of:

one or more candidate sets of beamforming weight-vectors to be used by the TRP when the TRP is performing the transmission, and for each candidate set of beamforming weight-vectors, of the one or more candidate sets of beamforming weight-vectors, a change in a service level to one or more user equipments (UEs) served by the TRP.

9. The apparatus of claim 8, wherein the one or more processors are further individually or collectively configured to:

receive, from another TRP, an indication of a change in a service level to one or more other UEs served by the other TRP; and select the set of beamforming weight-vectors from the one or more candidate sets of beamforming weight-vectors based at least in part on the indication of the change in the service level to the one or more UEs served by the TRP and the indication of the change in the service level to the one or more other UEs served by the other TRP.

10. The apparatus of claim 1, wherein the one or more beamforming-weight-vectors-cycling parameters include a peak-gain-reduction threshold associated with a difference in a first peak gain associated with a current beamforming weight-vector and a second peak gain associated with a candidate beamforming weight-vector.

11. The apparatus of claim 1, wherein the one or more processors are further individually or collectively configured to receive, from the TRP, an indication that a signal strength associated with a user equipment served by the TRP is below a signal-strength threshold when the TRP is performing the transmission.

12. An apparatus for wireless communication, comprising:

one or more memories; and one or more processors coupled to the one or more memories, the one or more processors individually or collectively configured to:

transmit, to a network node, capability information indicating a capability of the apparatus to cycle through a set of beamforming weight-vectors when the apparatus is performing a transmission;

receive, from the network node and based at least in part on the capability information, an indication of one or more beamforming-weight-vectors-cycling parameters; and perform the transmission by cycling through the set of beamforming weight-vectors based at least in part on the one or more beamforming-weight-vectors-cycling parameters.

13. The apparatus of claim 12, wherein the apparatus is associated with a reconfigurable holographic surface (RHS), and wherein the set of beamforming weight-vectors are associated with a set of holographic patterns for the RHS.

14. The apparatus of claim 13, wherein the set of holographic patterns are associated with controlling RHS-array radiation elements via a plurality of positive-intrinsic-negative (PIN) diodes, and wherein the one or more beamforming-weight-vectors-cycling parameters include a power threshold associated with a power consumption by the plurality of PIN diodes when the apparatus is performing the transmission.

15. The apparatus of claim 12, wherein the one or more processors are further individually or collectively configured to receive, from the network node, a request for beamforming-weight-vectors-cycling information.

16. The apparatus of claim 15, wherein the one or more processors are further individually or collectively configured to transmit, to the network node and based at least in part on the request for the beamforming-weight-vectors-cycling information, an indication of at least one of:

a cardinality of one or more candidate sets of beamforming weight-vectors to be used by the apparatus when the apparatus is performing the transmission, or interference randomization levels of the one or more candidate sets of beamforming weight-vectors to be used by the apparatus when the apparatus is performing the transmission.

17. The apparatus of claim 15, wherein the one or more processors are further individually or collectively configured to cause the apparatus to transmit, to the network node, based at least in part on the request for the beamforming-weight-vectors-cycling information, and for each candidate threshold level, of multiple candidate threshold levels selected by the apparatus, an indication of at least one of:

a corresponding candidate threshold level, a cardinality of one or more candidate sets of beamforming weight-vectors to be used by the apparatus when the apparatus is performing the transmission according to the corresponding candidate threshold level, or interference randomization levels of the one or more candidate sets of beamforming weight-vectors to be used by the apparatus when the apparatus is performing the transmission according to the corresponding candidate threshold level.

18. The apparatus of claim 15, wherein the one or more processors are further individually or collectively configured to:

transmit, to the network node and based at least in part on the request for the beamforming-weight-vectors-cycling information, an indication of one or more candidate sets of beamforming weight-vectors to be used by the apparatus when the apparatus is performing the transmission; and receive, from the network node, an indication of at least one of:

the set of beamforming weight-vectors, a duration for cycling through the set of beamforming weight-vectors when the apparatus is performing the transmission, or a cycling rate for cycling through the set of beamforming weight-vectors when the apparatus is performing the transmission.

19. The apparatus of claim 15, wherein the one or more processors are further individually or collectively configured to transmit, to the network node and based at least in part on the request for the beamforming-weight-vectors-cycling information, an indication of:

one or more candidate sets of beamforming weight-vectors to be used by the apparatus when the apparatus is performing the transmission, and for each candidate set of beamforming weight-vectors, of the one or more candidate sets of beamforming weight-vectors, a change in a service level to one or more user equipments served by the apparatus.

20. The apparatus of claim 12, wherein the one or more beamforming-weight-vectors-cycling parameters include a peak-gain-reduction threshold associated with a difference in a first peak gain associated with a current beamforming weight-vector and a second peak gain associated with a candidate beamforming weight-vector.

21. The apparatus of claim 12, wherein the one or more processors are further individually or collectively configured to:

receive, from a user equipment (UE) served by the apparatus, a first indication that a signal strength associated with UE is below a signal-strength threshold when the apparatus is performing the transmission; and transmit, to the network node, a second indication that the signal strength associated with UE is below the signal-strength threshold when the apparatus is performing the transmission.

22. The apparatus of claim 12, wherein the one or more processors are further individually or collectively configured to compute the set of beamforming weight-vectors based at least in part on the indication of the one or more beamforming-weight-vectors-cycling parameters.

23. The apparatus of claim 12, wherein the one or more processors, to perform the transmission by cycling through the set of beamforming weight-vectors, are individually or collectively configured to:

transmit, to a user equipment (UE), a set of signals, wherein each signal, of the set of signals, is transmitted using a beamforming weight-vector, of the set of beamforming weight-vectors;

receive, from the UE, an indication of a signal, of the set of signals, that is associated with a highest signal strength; and transmit, to the UE, a communication using a corresponding beamforming weight-vector based at least in part on a beamforming weight-vector that was used to transmit the signal associated with the highest signal strength.

24. The apparatus of claim 12, wherein the one or more processors, to perform the transmission by cycling through the set of beamforming weight-vectors, are individually or collectively configured to sequentially apply each beamforming weight-vector, of the set of beamforming weight-vectors, during the transmission.

25. A method of wireless communication performed by a network node, comprising:

receiving, from a transmission reception point (TRP), capability information indicating a capability of the TRP to cycle through a set of beamforming weight-vectors when the TRP is performing a transmission; and transmitting, to the TRP and based at least in part on the capability information, an indication of one or more beamforming-weight-vectors-cycling parameters associated with cycling through the set of beamforming weight-vectors.

26. The method of claim 25, wherein the TRP is associated with a reconfigurable holographic surface (RHS), and wherein the set of beamforming weight-vectors are associated with a set of holographic patterns for the RHS.

27. The method of claim 26, wherein the set of holographic patterns are associated with controlling RHS-array radiation elements via a plurality of positive-intrinsic-negative (PIN) diodes, and wherein the one or more beamforming-weight-vectors-cycling parameters include a power threshold associated with a power consumption by the plurality of PIN diodes when the TRP is performing the transmission.

28. A method of wireless communication performed by a transmission reception point (TRP), comprising:

transmitting, to a network node, capability information indicating a capability of the TRP to cycle through a set of beamforming weight-vectors when the TRP is performing a transmission;

receiving, from the network node and based at least in part on the capability information, an indication of one or more beamforming-weight-vectors-cycling parameters; and performing the transmission by cycling through the set of beamforming weight-vectors based at least in part on the one or more beamforming-weight-vectors-cycling parameters.

29. The method of claim 28, wherein the TRP is associated with a reconfigurable holographic surface (RHS), and wherein the set of beamforming weight-vectors are associated with a set of holographic patterns for the RHS.

30. The method of claim 28, wherein the one or more beamforming-weight-vectors-cycling parameters include a peak-gain-reduction threshold associated with a difference in a first peak gain associated with a current beamforming weight-vector and a second peak gain associated with a candidate beamforming weight-vector.

* * * * *